(12) United States Patent
Kim et al.

(10) Patent No.: US 10,978,915 B2
(45) Date of Patent: Apr. 13, 2021

(54) WIRELESS POWER TRANSMISSION APPARATUS AND OPERATING METHOD THEREOF

(71) Applicant: Samsung Electronics Co., Ltd., Gyeonggi-do (KR)

(72) Inventors: Kwang-Seob Kim, Gyeonggi-do (KR); Dong-Zo Kim, Gyeonggi-do (KR); Ji-Won Kim, Gyeonggi-do (KR); Keum-Su Song, Seoul (KR); Min-Cheol Ha, Gyeonggi-do (KR); Jong-Chul Hong, Gyeonggi-do (KR); Se-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/489,012

(22) PCT Filed: Feb. 1, 2018

(86) PCT No.: PCT/KR2018/001389
§ 371 (c)(1),
(2) Date: Aug. 27, 2019

(87) PCT Pub. No.: WO2018/164376
PCT Pub. Date: Sep. 13, 2018

(65) Prior Publication Data
US 2020/0006986 A1 Jan. 2, 2020

(30) Foreign Application Priority Data
Mar. 6, 2017 (KR) .................. 10-2017-0028415

(51) Int. Cl.
*H02J 50/12* (2016.01)
*H02J 7/02* (2016.01)
*H02M 7/58* (2006.01)

(52) U.S. Cl.
CPC .............. *H02J 50/12* (2016.02); *H02J 7/025* (2013.01); *H02M 7/58* (2013.01)

(58) Field of Classification Search
None
See application file for complete search history.

(56) References Cited

U.S. PATENT DOCUMENTS

| | | | |
|---|---|---|---|
| 2009/0033280 A1 | 2/2009 | Choi et al. | |
| 2012/0235509 A1* | 9/2012 | Ueno | H02J 7/025 307/104 |

(Continued)

FOREIGN PATENT DOCUMENTS

| | | |
|---|---|---|
| EP | 2 787 596 A2 | 10/2014 |
| KR | 10-2013-0102218 A | 9/2013 |

(Continued)

OTHER PUBLICATIONS

European Search Report dated Nov. 20, 2019.

*Primary Examiner* — Jared Fureman
*Assistant Examiner* — Aqeel H Bukhati
(74) *Attorney, Agent, or Firm* — Cha & Reiter, LLC.

(57) ABSTRACT

A wireless power transmission apparatus according to various embodiments of the present invention may comprise: a power provision circuit for providing direct current (DC) power; a first conductive pattern; a second conductive pattern; multiple first switches connected to one end of the first conductive pattern and one end of the second conductive pattern; multiple second switches connected to the other end of the first conductive pattern; multiple third switches connected to the other end of the second conductive pattern; and a control circuit, wherein the control circuit controls the multiple first switches and the multiple second switches to convert the DC power into first alternating current (AC) power and apply the first AC power to the first conductive pattern and control the multiple first switches and the (Continued)

multiple third switches to convert the DC power into second AC power and apply the second AC power to the second conductive pattern. Various other embodiments are possible.

15 Claims, 17 Drawing Sheets

(56) References Cited

U.S. PATENT DOCUMENTS

| | | | |
|---|---|---|---|
| 2014/0191713 A1 | 7/2014 | Hong et al. | |
| 2014/0340031 A1 | 11/2014 | Mi et al. | |
| 2015/0061403 A1 | 3/2015 | Jeong et al. | |
| 2016/0149416 A1 | 5/2016 | Ha et al. | |
| 2016/0241087 A1 | 8/2016 | Bae | |
| 2016/0359369 A1* | 12/2016 | Jeong | H02J 50/12 |

FOREIGN PATENT DOCUMENTS

| | | |
|---|---|---|
| KR | 10-2016-0061228 A | 5/2016 |
| KR | 10-2016-0100755 A | 8/2016 |
| KR | 10-2016-0100795 A | 8/2016 |
| KR | 10-2016-0126743 A | 11/2016 |

* cited by examiner

WIRELESS POWER TRANSMISSION APPARATUS AND OPERATING METHOD THEREOF

CROSS-REFERENCE TO RELATED APPLICATION(S)

This application is a National Phase Entry of PCT International Application No. PCT/KR2018/001389, which was filed on Feb. 1, 2018, and claims priority to Korean Patent Application No. 10-2017-0028415, which was filed on Mar. 6, 2017, the contents of which are incorporated herein by reference.

BACKGROUND

1. Field

Various embodiments of the disclosure relate to a wireless power transmission apparatus and a method for operating the same and, more specifically, to a wireless power transmission apparatus and a method for operating the same wherein power is transmitted wirelessly by using a conductive pattern.

2. Description of the Related Art

Recent development of wireless charging technologies has been followed by research on methods for supplying power to various electronic devices and charging the same by using a single charging device.

Such wireless charging technologies provide a system using wireless power transmission/reception such that an electronic device need not be connected to a separate charging connector, for example, but has only to be placed on a charging pad, thereby automatically charging the battery.

The wireless charging technologies are largely categorized as an electromagnetic induction type that uses coils, a resonance type that uses resonance, and an RF/microwave radiation type that converts electric energy into microwaves and transfers the same.

According to the power transmission method based on wireless charging, power is transmitted between the first coil of the transmitting end and the second coil of the receiving end. The transmitting end generates a magnetic field, and the receiving end induces or resonates a current according to a change in the magnetic field thereby generating energy.

Wireless charging technologies using the electromagnetic induction type or magnetic resonance type have recently become widespread in connection with electronic devices such as smartphones. When a power transmitting unit (PTU) (for example, a wireless charging pad) and a power receiving unit (PRU) (for example, a smartphone) come into contact or approach each other within a predetermined distance, the battery of the power receiving unit may be charged by electromagnetic induction or electromagnetic resonance between the transmitting coil of the power transmitting unit and the receiving coil of the power receiving unit.

SUMMARY

A wireless power transmitting apparatus using the electromagnetic induction type or the resonance type may include a conductive pattern. The wireless power transmitting apparatus may apply an AC current having a frequency defined by a relevant standard to the conductive pattern. The wireless power transmitting apparatus may include multiple conductive patterns in order to improve the degree of freedom of the charging position. A circuit for generating an AC current, for example, a bridge circuit, may be connected to each of the multiple conductive patterns. Each bridge circuit may include multiple switches such as, for example, multiple field effect transistors (FETs).

Respective output ends of the multiple conductive patterns may be connected to each other. When the wireless power transmitting apparatus conducts a control such that power is applied to a specific conductive pattern, a leak current may flow to a conductive pattern other than the specific conductive pattern. Alternatively, an electromagnetic field generated by a specific conductive pattern may affect another conductive pattern. As a result, the other conductive pattern may generate a signal (counter-electromotive force) that degrades the power applied to the specific conductive pattern. A problem may occur if sufficient power required by the specific conductive pattern is not applied (for example, if a sufficient voltage is not applied, or if a sufficient magnitude of current cannot flow).

A wireless power transmission apparatus and a method for operating the same, according to various embodiments of the disclosure, have been made to solve the above-mentioned problems or other problems, and are configured such that multiple conductive patterns may share at least a part of a switch of a circuit for generating an AC current. In addition, a wireless power transmission apparatus and a method for operating the same, according to various embodiments of the disclosure, may conduct a control such that configured power is applied to a specific conductive pattern, and no power is applied to conductive patterns other than the specific conductive pattern.

According to various embodiments of the disclosure, a wireless power transmission apparatus may include: a power provision circuit configured to provide DC power; a first conductive pattern; a second conductive pattern; multiple first switches connected to one end of the first conductive pattern and to one end of the second conductive pattern; multiple second switches connected to the other end of the first conductive pattern; multiple third switches connected to the other end of the second conductive pattern; and a control circuit. The control circuit may be configured to control the multiple first switches and the multiple second switches so as to convert the DC power into first AC power and to apply the first AC power to the first conductive pattern, and the control circuit may be configured to control the multiple first switches and the multiple third switches so as to convert the DC power into second AC power and to apply the second AC power to the second conductive pattern.

According to various embodiments of the disclosure, a method for operating a wireless power transmission apparatus including a power provision circuit configured to provide DC power, a first conductive pattern, a second conductive pattern, multiple first switches connected to one end of the first conductive pattern and to one end of the second conductive pattern, multiple second switches connected to the other end of the first conductive pattern, and multiple third switches connected to the other end of the second conductive pattern may include the operations of: selecting the first conductive pattern as a conductive pattern to perform charging; connecting the first conductive pattern with the power provision circuit and not connecting the second conductive pattern with the power provision circuit; and controlling the multiple first switches and the multiple second switches so as to convert the DC power into first AC power and to apply the first AC power to the first conductive pattern.

According to various embodiments of the disclosure, a wireless power transmission apparatus may include: a power provision circuit configured to provide DC power; a first conductive pattern; a second conductive pattern; multiple common conversion switches; multiple first switches configured to constitute a first bridge circuit together with the multiple common conversion switches; and multiple second switches configured to constitute a second bridge circuit together with the multiple common conversion switches. The first bridge circuit may be configured to convert the DC power into first AC power and to apply the same to the first conductive pattern. The second bridge circuit may be configured to convert the DC power into second AC power and to apply the same to the second conductive pattern.

According to various embodiments of the disclosure, when power is supplied to at least one of multiple conductive patterns, unnecessary power generation in the remaining conductive patterns may be reduced.

According to various embodiments of the disclosure, when power is supplied to at least one of multiple conductive patterns, a signal (counter-electromotive force) element that degrades the power supplied to the conductive pattern may be reduced.

DETAILED DESCRIPTION

Figure 1:
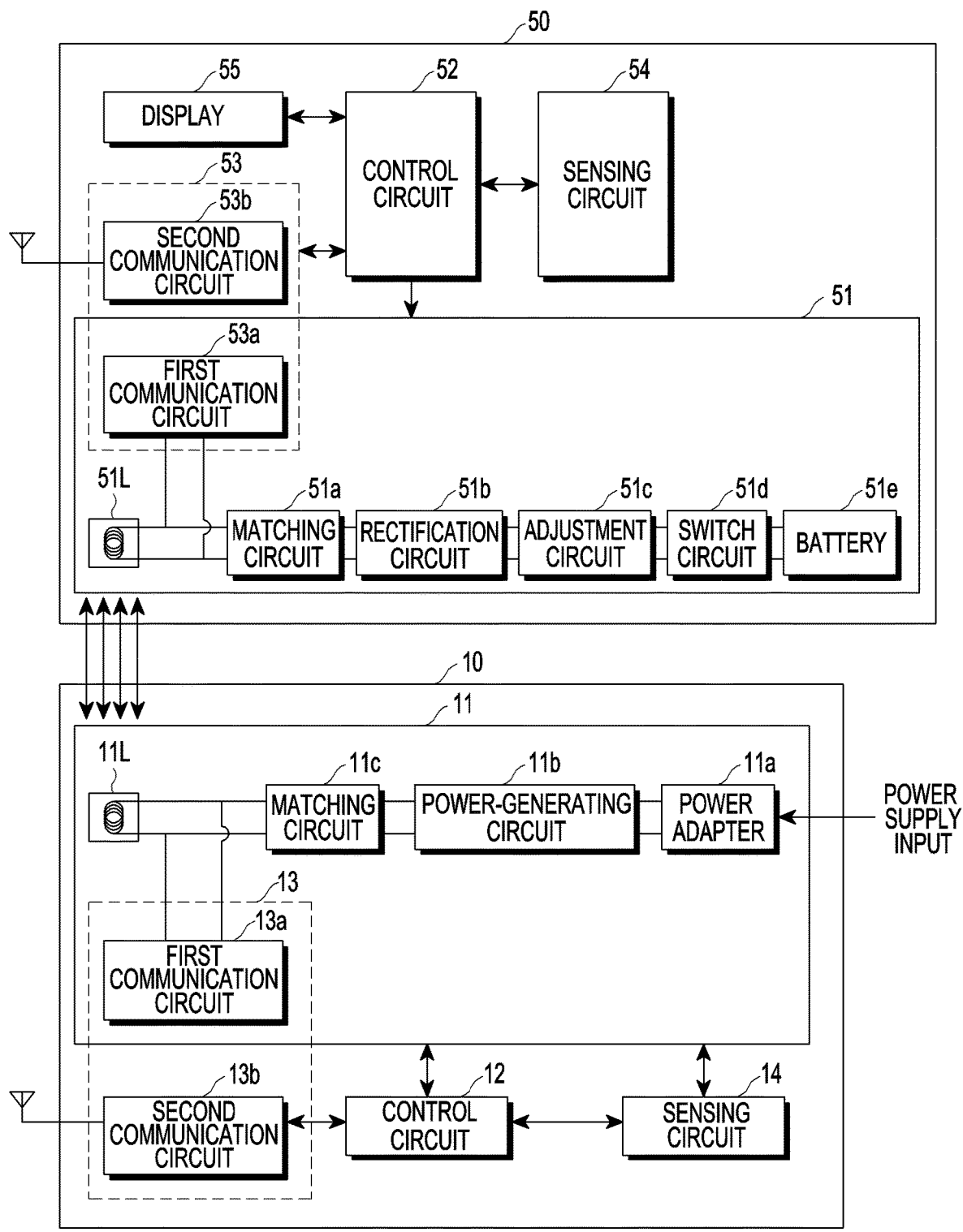
FIG. 1 is a block diagram of a wireless power transmission apparatus and an electronic device configured to receive wireless power according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller's Machine (ATM) in banks, Point Of Sales (POS) in a shop, or an interne device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment of the disclosure, the electronic devices are not limited to those described above. In the disclosure, the term "user" may indicate a person using an electronic device or a device (e.g., an artificial intelligence electronic device) using an electronic device. There is no limitation on the electronic device so long as the electronic device can wirelessly transmit or receive power.

Wireless charging technology provides a system using wireless power transmission/reception such that the battery of an electronic device (for example, a mobile phone) can be charged without connecting a separate charging connector thereto. The wireless charging technology is advantageous in that the portability of the electronic device can be improved because no separate external device (for example, a TA adapter) is necessary to charge the electronic device, and the waterproofing function can be improved because no connector is necessary for connection with an external device.

A wireless power transmission apparatus may transfer power to a wireless power reception device by using at least one of an inductive coupling scheme, which is based on an electromagnetic induction phenomenon caused by a wireless power signal, and an electromagnetic resonance coupling scheme, which is based on an electromagnetic resonance phenomenon caused by a wireless power signal having a specific frequency.

A wireless power transmission method based on electromagnetic induction refers to technology for wirelessly transmitting power by using a primary conductive pattern and a secondary conductive pattern, wherein a magnetic field that is generated and changed by an electromagnetic induction phenomenon occurring in one conductive pattern induces a current in the other conductive pattern, thereby transferring power.

According to various embodiments of the disclosure, the above method refers to a technology for generating electromagnetic resonance in the electronic device by a wireless power signal transmitted by the wireless power transmission apparatus and transferring power from the wireless power transmission apparatus to the electronic device by means of the resonance phenomenon.

According to various embodiments, when a change occurs in the voltage or current flowing through the primary conductive pattern (primary coil) of the wireless power transmission apparatus during power transfer by the wireless power transmitter, the current changes the magnetic field passing through the primary conductive pattern. The changed magnetic field causes an electromotive force in the secondary conductive pattern (secondary coil) of the wireless power reception device. The same may be influenced by the alignment and distance between the wireless power transmission apparatus and the wireless power reception device including respective conductive patterns. Meanwhile, the wireless power transmission apparatus may be configured to include a flat surface-type interface surface in order to wirelessly transfer power. At least one electronic device may be placed on the upper portion of the interface surface, and a transmission conductive pattern may be mounted on the lower surface of the interface surface. In addition, an alignment indicator may be formed on the upper portion of the interface surface so as to indicate the position in which the electronic device is to be placed. The alignment indicator may indicate the position of the electronic device such that an appropriate alignment is established between the transmission conductive pattern mounted on the lower portion of the interface surface and the reception conductive pattern. In some embodiments, the alignment indicator may be simple marks. In some embodiments, the alignment indicator may be formed in a protruding structure that guides the position of the electronic device. Moreover, in some embodiments, the alignment indicator may be formed as a magnetic body, such as a magnet, mounted on the lower surface of the interface surface so as to guide an appropriate alignment between the conductive patterns by means of a drawing force between the same and another magnetic body having a different pole mounted inside the electronic device.

According to various embodiments, the wireless power transmission apparatus or the wireless power reception device (for example, an electronic device) may output feedback in response to the alignment state in order to improve the charging efficiency. The feedback may include a voice message, a predetermined sound effect, a vibration, a text message, and a moving image that shows an exemplary manner of correcting the alignment through a display.

According to various embodiments, the wireless power transmission apparatus may be formed to include one or more transmission conductive patterns. The wireless power transmitter may selectively use some of the one or more transmission conductive patterns, which are appropriately aligned with the receiving conductive pattern of the electronic device, so as to improve the power transmission efficiency. In addition, the conductive patterns may be movable-type conductive patterns. The wireless power transmission apparatus may include a driving unit which moves the transmission conductive pattern, when the position of the wireless power reception device is determined by a position sensing unit, such that the distance between the center of the transmission conductive pattern and that of the reception conductive pattern of the electronic device reaches a predetermined range or less, or rotates the transmission conductive pattern such that the center of the transmission conductive pattern and that of the reception conductive pattern overlap. The wireless power transmission apparatus may further include a multiplexer configured to establish connection between some of the one or more transmission conductive patterns, and to disconnect the same. The multiplexer may be controlled such that, when the position of a wireless power reception device placed on the upper portion of the interface surface is sensed, some conductive patterns among the one or more transmission conductive patterns, which may have an inductive or resonance coupling relationship with the reception conductive pattern of the wireless power reception device, can be connected in view of the sensed position.

According to various embodiments, the power conversion unit of the wireless power transmission apparatus may be configured to include one or more transmission conductive patterns and a resonance-forming circuit connected to each transmission conductive pattern. In addition, the power conversion unit may further include a multiplexer configured to establish connection between some of the one or more transmission conductive patterns and to disconnect the same. The one or more transmission conductive patterns may be configured to have the same resonance frequency. According to an embodiment, some of the one or more transmission conductive patterns may be configured to have different resonance frequencies, and this may be determined according to what inductance and/or capacitance the resonance-forming circuits have, which are connected to the one or more transmission conductive patterns, respectively.

FIG. 1 is a block diagram of a wireless power transmission apparatus and an electronic device configured to wirelessly receive power according to various embodiments of the disclosure.

A wireless power transmission apparatus 10 according to an embodiment of the disclosure may include at least one of a power transmission circuit 11, a control circuit 12, a communication circuit 13, or a sensing circuit 14. The electronic device 50 configured to wirelessly receive power may include at least one of a power reception circuit 51, a control circuit 52, a communication circuit 53, a sensing circuit 54, or a display 55.

The power transmission circuit 11 according to an embodiment of the disclosure may provide power to the electronic device 50. The power transmission circuit 11 may include a power adapter 11a, a power-generating circuit 11b, a matching circuit 11c, a conductive pattern (for example, a coil) 11L, or a first communication circuit 13a. The power transmission circuit 11 may be configured to transmit power wirelessly to the electronic device 50 through the conductive pattern 11L. The power transmission circuit 11 may receive power from the outside in a DC or AC waveform type, and may supply the received power to the electronic device 50 in an AC waveform type. The conductive pattern 11L may include multiple conductive patterns.

The power adapter 11a may receive a supply of AC or DC power from the outside or receive a power supply signal from an embedded battery device, and may output DC power having a configured voltage value. The voltage value of the DC power output by the power adapter 11a may be controlled by the control circuit 12. The DC power output by the power adapter 11a may be output to the power generating-circuit 11b.

The power-generating circuit 11b may convert the DC current output by the power adapter 11a into an AC current and output the same. The power-generating circuit 11b may include a predetermined amplifier (not illustrated). If the DC voltage or current input through the power adapter 11a is smaller than a configured gain, the same may be amplified to a configured value by using the amplifier. The power-generating circuit 11b may include a circuit configured to convert the DC current input from the power adapter 11a into an AC current on the basis of a control signal input from the control circuit 12. The power-generating circuit 11b according to various embodiments of the disclosure may include a bridge circuit including multiple switches. The conductive pattern 11L may include multiple conductive patterns, and the multiple conductive patterns may share at least a part of the power-generating circuit 11b, as will be described later in more detail. For example, the power-generating circuit 11b may convert the DC current into an AC current through an inverter. The power-generating circuit 11b may include a gate driving device (not illustrated). The gate driving device may change the DC current into an AC current while conducting on/off control thereof. Alternatively, the power-generating circuit 11b may generate an AC power supply signal through a wireless power supply generator (for example, an oscillator).

The matching circuit 11c may perform impedance matching. For example, if an AC signal output by the power-generating circuit 11b is transferred to the conductive pattern 11L, an electromagnetic field may be formed in the conductive pattern 11L by the AC signal. According to various embodiments of the disclosure, the AC signal may be provided to only some of the multiple conductive patterns, and this will be described later in more detail. The frequency band of the formed electromagnetic field signal may be adjusted by adjusting the impedance of the matching circuit 11c. Through the impedance adjustment, the matching circuit 11c may control the output power, which is transferred to the electronic device 50 through the conductive pattern 11L, to have high efficiency or high output. The impedance of the matching circuit 11c may be adjusted under the control of the control circuit 12. The matching circuit 11c may include at least one of an inductor (for example, a conductive pattern), a capacitor, or a switch device. The control circuit 12 may control the state of connection with at least one of the inductor or the capacitor through the switch device, and may perform impedance matching accordingly. At least one of the control circuit 12 or the control circuit 52 may be implemented as various circuits capable of performing operations, such as a versatile processor (for example, a CPU), a minicomputer, a microprocessor, a micro controlling unit (MCU), and a field programmable gate array (FPGA), and the type thereof is not limited.

If a current is applied to the conductive pattern 11L, a magnetic field for inducing or resonating a current in the electronic device 50 may be formed. The first communication circuit 13a (for example, a resonance circuit) may perform communication (for example, data communication) in an in-band type by using electromagnetic waves generated by the conductive pattern 11L.

The sensing circuit 14 may sense a change in the current/voltage applied to the conductive pattern 11L of the power transmission circuit 11. The wireless power transmission apparatus 10 may change the amount of power to be transmitted, according to the change in the current/voltage applied to the conductive pattern 11L. Alternatively, the sensing circuit 14 may sense a change in temperature of the wireless power transmission apparatus 10. According to an embodiment, the sensing circuit 14 may include at least one of a current/voltage sensor or a temperature sensor. In various embodiments of the disclosure, a part of the sensing circuit 14, for example, the current/voltage sensor, may be included in the power transmission circuit 11, and another part thereof, for example, the temperature sensor, may be arranged outside the power transmission circuit 11.

The control circuit 12 may conduct a control such that power is wirelessly transmitted to the electronic device 50 through the power transmission circuit 11. The control circuit 12 may conduct a control such that information is wirelessly transmitted to or received from the electronic device 50 through the communication circuit 13.

According to an embodiment, the received information may include at least one of charging configuration information related to the battery state of the electronic device 50, power amount control information related to adjustment of the amount of power transmitted to the electronic device 50, environment information related to the charging environment of the electronic device 50, or time information of the electronic device 50.

The charging configuration information may be information related to the battery state of the electronic device 50 at the timepoint of wireless charging between the wireless power transmission apparatus 10 and the electronic device 50. For example, the charging configuration information may include at least one of the entire battery capacity of the electronic device 50, the amount of power remaining in the battery, the number of times of charging, the amount of battery usage, the charging mode, the charging type, or the wirelessly received frequency band.

The power amount control information may be information for controlling the amount of transmitted initial power according to a change in the amount of power accumulated in the electronic device 50 during wireless charging between the wireless power transmission apparatus 10 and the electronic device 50.

The environment information is information obtained by measuring the charging environment of the electronic device 50 by the sensing circuit 54 of the electronic device 50, and may include, for example, at least one of temperature data including at least one of the internal temperature or external temperature of the electronic device 50, luminance data indicating the luminance (brightness) on the periphery of the electronic device 50, or sound data indicating the sound (noise) on the periphery of the electronic device 50.

The control circuit 12 may be controlled to generate power to be transmitted to the electronic device 50 or to transmit the same, on the basis of the charging configuration information among the received information. Alternatively, the control circuit 12 may determine or change the amount of power transmitted to the electronic device 50 on the basis of at least a part of the received information (for example, at least one of the power amount control information, the environment information, or the time information). Alternatively, the matching circuit 11c may be controlled to change the impedance.

The communication circuit 13 may perform communication with the electronic device 50 in a predetermined type. The communication circuit 13 may perform data communication with the communication circuit 53 of the electronic device 50. For example, the communication circuit 13 may unicast, multicast, or broadcast the signal.

According to an embodiment, the communication circuit 13 may include at least one of a first communication circuit 13a implemented as a single piece of hardware with the power transmission circuit 11 such that the wireless power transmission apparatus 10 can perform communication in an in-band type or a second communication circuit 13b implemented as hardware different from the power transmission circuit 11 such that the wireless power transmission apparatus 10 can perform communication in an out-of-band type.

According to an embodiment, when the communication circuit 13 includes the first communication circuit 13a that enables the in-band type communication, the first communication circuit 13 may receive the frequency and the signal level of an electromagnetic field signal received through the conductive pattern 11L of the power transmission circuit 11. The control circuit 12 may decode the received frequency and signal level of the received electromagnetic field signal, thereby extracting information received from the electronic device 50. Alternatively, the first communication circuit 13 may apply a signal regarding information of the wireless power transmission apparatus 10, which is to be transmitted to the electronic device 50, to the conductive pattern 11L of the power transmission circuit 11, or may add a signal regarding information of the wireless power transmission apparatus 10 to an electromagnetic field signal generated by applying a signal output by the matching circuit 11c to the conductive pattern 11L, and may transmit the same to the electronic device 50. The control circuit 12 may conduct a control such that, through on/off control of the switch device included in the matching circuit 11c, the state of connection with at least one of the inductor or the capacitor of the matching circuit 11c is changed and output.

According to an embodiment, when the communication circuit 13 includes the second communication circuit 13b that enables the out-of-band type communication, the second communication circuit 13b may perform communication with the communication circuit 53 (for example, the second communication circuit 282) of the electronic device 50 by using near-field communication (NFC), Zigbee communication, infrared communication, visible-ray communication, Bluetooth communication, or Bluetooth low energy (BLE) scheme.

The above-mentioned communication type of the communication circuit 13 is simply exemplary, and the scope of embodiments of the disclosure is not limited by any specific type of communication performed by the communication circuit 13.

According to an embodiment, the electronic device 50 may include a power reception circuit 51, a control circuit 52, a communication circuit 53, a sensing circuit 54, or a display 55. The power reception circuit 51 of the electronic device 50 may receive power from the power transmission circuit 11 of the wireless power transmission apparatus 10. The power reception circuit 51 may be implemented as an embedded battery or implemented as a power reception interface so as to receive power from the outside. The power reception circuit 51 may include a matching circuit 51a, a rectification circuit 51b, an adjustment circuit 51c, a switch circuit 51d, a battery 51e, or a conductive pattern 276.

The power reception circuit 51 may receive electromagnetic wave-type wireless power, which is generated in response to the current/voltage applied to the conductive pattern 11L of the power transmission circuit 11, through the conductive pattern 276. For example, the power reception circuit 51 may receive power by using an electromotive force formed in the conductive pattern 11L of the power transmission circuit 11 and the conductive pattern 51L of the power reception circuit 51.

The matching circuit 51a may perform impedance matching. For example, power transmitted through the conductive pattern 11L of the wireless power transmission apparatus 10 may be transferred to the conductive pattern 51L, thereby forming an electromagnetic field. By adjusting the impedance, the matching circuit 51a may adjust the frequency band of the formed electromagnetic field signal. The matching circuit 51a may conduct a control, through the impedance adjustment, such that input power received from the wireless power transmission apparatus 10 through the conductive pattern 51L have high efficiency and high output. The matching circuit 51a may adjust the impedance under the control of the control circuit 52. The matching circuit 51a may include at least one of an inductor (for example, a conductive pattern), a capacitor, or a switch device. The control circuit 52 may control the state of connection with at least one of the inductor or the capacitor through the switch device, and may perform impedance matching accordingly.

The rectification circuit 51b may rectify wireless power received by the conductive pattern 276 into a DC type and may be implemented as a bridge diode, for example.

The adjustment circuit 273 may convert the rectified power into a configured voltage or current. The adjustment circuit 273 may include a DC/DC converter (not illustrated). For example, the adjustment circuit 273 may convert the rectified power such that the voltage at the output end becomes 5V. Alternatively, the minimum value or maximum value of the voltage that can be applied at the front end of the adjustment circuit 273 may be configured.

The switch circuit 51d may connect the adjustment circuit 273 and the battery 51e. The switch circuit 51d may maintain an on/off state under the control of the control circuit 52.

The battery 51e may be charged with power input and received from the adjustment circuit 273. In another embodiment, a charger (not illustrated) may be additionally arranged between the switch circuit 51d and the battery 51e, and the charger (not illustrated) may change the voltage or current of power received in a predetermined mode (for example, constant current (CC) mode or constant voltage (CV) mode) and charge the battery 51e therewith. In various embodiments of the disclosure, the DC/DC converter of the adjustment circuit 51c may directly charge the battery 51e, or the charger (not illustrated) may adjust the power output by the adjustment circuit 51c once more and charge the battery 51e therewith.

The sensing circuit 54 may sense a change in the state of power received by the electronic device 50. For example, the sensing circuit 54 may measure the current/voltage value received by the conductive pattern 51L through a predetermined current/voltage sensor periodically or aperiodically. The electronic device 50 may calculate the amount of power received by the electronic device 50 on the basis of the measured current/voltage. In various embodiments of the disclosure, a part of the sensing circuit 54, for example, the current/voltage sensor, may be included in the power reception circuit 51, and another part thereof, for example, the temperature sensor, may be arranged outside the power reception circuit 51. According to an embodiment, the power reception circuit 51 may further include a sensing circuit capable of sensing a change in the state of power received by the electronic device 50. For example, the sensing circuit capable of sensing a change in the state of power may measure the current value or voltage value received by the coil 51L periodically or aperiodically. The control circuit 52 may calculate the amount of power received by the electronic device 50 on the basis of the measured current or voltage. In addition, the sensing circuit capable of sensing a change in the state of power may detect a change in the current or voltage input to the rectification circuit 51b or output from the rectification circuit 51b, for example, may detect a change in the current or voltage input to an overvoltage protective circuit (not illustrated) or output from the overvoltage protective circuit (not illustrated), or may further detect a change in the current or voltage input to the adjustment circuit 51c. According to an embodiment, the sensing circuit capable of sensing a change in the state of power may further include a current sensor or a voltage sensor.

According to various embodiments, the electronic device 50 may further include a sensing circuit capable of detecting a change in the state of the electronic device 50. For example, the sensing circuit capable of detecting a change in the state of the electronic device 50 may detect a change in the temperature of the electronic device 50 periodically or aperiodically. The sensing circuit capable of detecting a change in the state of the electronic device 50 may detect a movement of the electronic device 50 periodically or aperiodically. According to an embodiment, the sensing circuit capable of detecting a change in the state of the electronic device 50 may include one of a temperature sensor, a motion sensor, a position measurement sensor, or a combination thereof.

According to an embodiment, the sensing circuit 54 may sense a change in the charging environment of the electronic device 50. For example, the sensing circuit 54 may measure at least one of the inner temperature or outer temperature of the electronic device 50 periodically or aperiodically through a predetermined temperature sensor.

The display 55 may display overall information regarding the charging state of the electronic device 50. For example, the display 55 may display at least one of the entire battery capacity of the electronic device 50, the amount of power remaining in the battery, the battery charging level, the amount of battery usage, or the expected charging time.

The communication circuit 53 may perform communication with the wireless power transmission apparatus 10 in a predetermined type. The communication circuit 53 may perform data communication with the communication circuit 13 of the wireless power transmission apparatus 10. The communication circuit 53 may operate similarly or identically to the communication circuit 13 of the wireless power transmission apparatus 10.

The control circuit 52 may transmit charging configuration information for receiving the necessary amount of power on the basis of information regarding the battery state of the electronic device 50 to the wireless power transmission apparatus 10 through the communication circuit 53. For example, if a wireless power transmission apparatus 10 capable of wirelessly transmitting power is identified, the control circuit 52 may transmit the charging configuration information for receiving the necessary amount of power on the basis of at least one of the entire battery capacity of the electronic device 50, the amount of power remaining in the battery, the number of times of charging, the amount of battery usage, the charging mode, the charging type, or the wirelessly received frequency band, to the wireless power transmission apparatus 10 through the communication circuit 53.

The control circuit 52 may transmit the power amount control information for controlling the amount of power received from the wireless power transmission apparatus 10 according to a change in the amount of power accumulated in the electronic device 50 to the wireless power transmission apparatus 10 through the communication circuit 53. The first communication circuit 53a may include a switch and a capacitor or a resistor. The control circuit 52 may turn the switch on/off according to a binary code of data to be transmitted, on the basis of an on/off keying modulation scheme. In connection with the impedance sensed in the wireless power transmission apparatus 10, it is possible to detect a change in the magnitude of power or the magnitude of current in the power transmission circuit 11 according to turning on/off of the switch, and the same may be demodulated into a binary code, thereby making it possible to acquire data to be transmitted by the electronic device 50.

The control circuit 52 may transmit the environment information that follows a change in the charging environment of the electronic device 50 to the wireless power transmission apparatus 10. For example, if a temperature data value measured by the sensing circuit 54 is equal to or higher than a configured temperature reference value, the control circuit 52 may transmit the measured temperature data to the wireless power transmission apparatus 10.

Although it is assumed in the embodiment of the disclosure illustrated in FIG. 1 that the wireless power transmission apparatus 10 and the electronic device 50 solely include a power transmission circuit 11 and a power reception circuit 51, respectively, each of the wireless power transmission apparatus 10 and the electronic device 50 may include both the power transmission circuit 11 and the power reception circuit 51. Accordingly, the wireless power transmission apparatus 10 and the electronic device 50 according to an embodiment of the disclosure may perform both the function of a power transmission device and that of an electronic device.

Figure 2A:
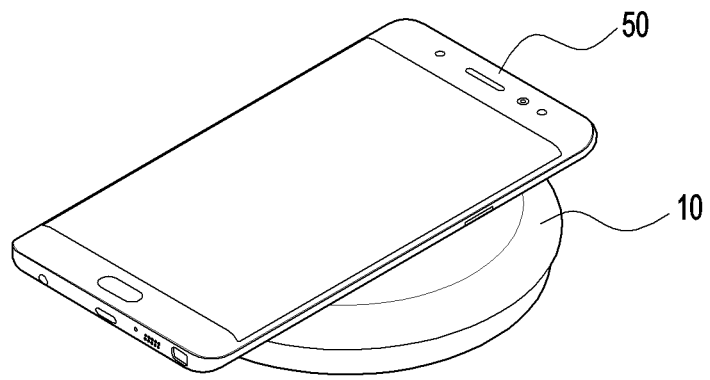
FIG. 2A and FIG. 2B are conceptual diagrams of a wireless power transmission apparatus and an electronic device according to various embodiments of the disclosure.
Figure 2B:
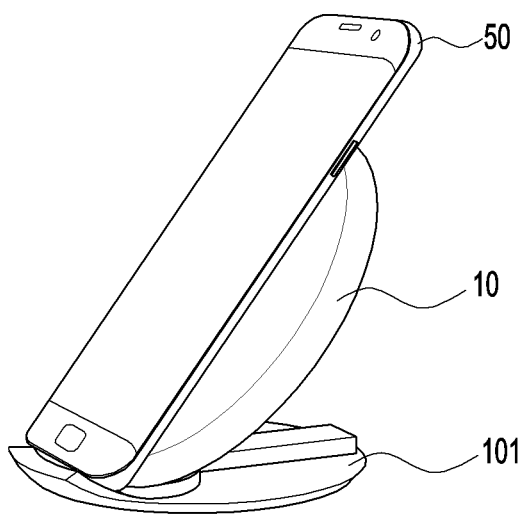

FIG. 2A and FIG. 2B are conceptual diagrams of a wireless power transmission apparatus and an electronic device according to various embodiments of the disclosure.

As illustrated in FIG. 2A, the wireless power transmission apparatus 10 may include, for example, a housing shaped to be able to support the electronic device 50. The electronic device 50 may be arranged on the wireless power transmission apparatus 10. At least one of the constituent elements of the wireless power transmission apparatus 10 described with reference to FIG. 1 may be arranged in the housing of the wireless power transmission apparatus 10.

The wireless power transmission apparatus 10 may be manipulated to stand at a predetermined angle with regard to the floor by means of a support table 101, for example, as illustrated in FIG. 2B. As the wireless power transmission apparatus 10 stands at a predetermined angle with regard to the floor, the electronic device 50 may also be charged while standing at a predetermined angle with regard to the floor.

Figure 3A:
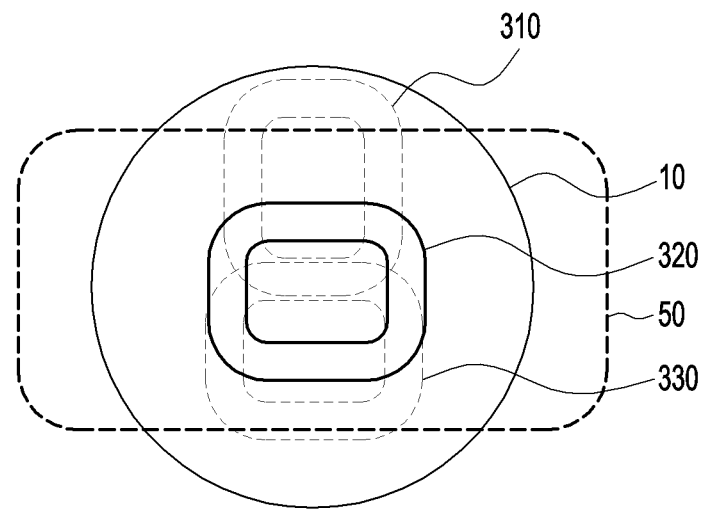
FIG. 3A is a conceptual diagram illustrating arrangement of a conductive pattern inside a wireless power transmission apparatus according to various embodiments of the disclosure.

FIG. 3A is a conceptual diagram illustrating arrangement of a conductive pattern inside a wireless power transmission apparatus according to various embodiments of the disclosure.

As illustrated in FIG. 3A, the wireless power transmission apparatus 10 according to various embodiments of the disclosure may include, for example, three conductive patterns 310, 320, and 330. Each of the conductive patterns 310, 320, and 330 may be arranged to expand the degree of freedom of the position of arrangement of the electronic device or the direction of arrangement of the electronic device. For example, when the electronic device 50 is arranged on the wireless power transmission apparatus 10 in the vertical direction, the first conductive pattern 310 may be arranged adjacent to a conductive pattern for receiving power from the wireless power transmission apparatus 10. For example, when the electronic device 50 is arranged on the wireless power transmission apparatus 10 in the horizontal direction, the second conductive pattern 320 may be arranged adjacent to the conductive pattern for receiving power from the wireless power transmission apparatus 10. A person skilled in the art could easily understand that the positioning of the first conductive pattern 310 and the second conductive pattern 320 according to the direction of arrangement of the electronic device 50 described above is simply exemplary, and the number of conductive patterns inside the wireless power transmission apparatus 10 is also exemplary.

Figure 3B:
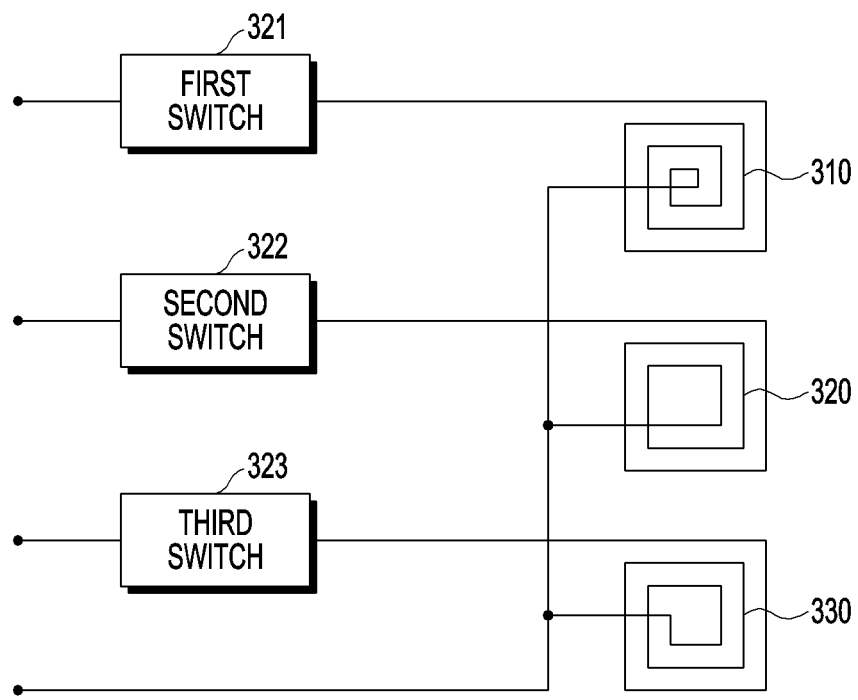
FIG. 3B is a conceptual diagram illustrating circuit arrangement of a conductive pattern inside a wireless power transmission apparatus according to various embodiments of the disclosure.

FIG. 3B is a conceptual diagram illustrating circuit arrangement of a conductive pattern inside a wireless power transmission apparatus according to various embodiments of the disclosure.

As illustrated in FIG. 3B, one end of the first conductive pattern 310 may be connected to the first switch 321, one end of the second conductive pattern 320 may be connected to the second switch 322, and one end of the third conductive pattern 330 may be connected to the third switch 323. It can be determined whether a current is applied or not to each of the first conductive pattern 310, the second conductive pattern 320, and the third conductive pattern 330 according to the on/off state of each of the first switch 321, the second switch 322, and the third switch 323. For example, if the first switch 321 is controlled to switch to an on-state, a current may flow through the first conductive pattern 310. Since a current may be applied or not to each of the multiple conductive patterns 310, 320 and 330 according to the on/off state of each of the first switch 321, the second switch 322, and the third switch 323, the switches 321, 322, and 323 connected to the conductive patterns 310, 320 and 330 may also be referred to as power application control switches.

The control circuit 12 may select a conductive pattern arranges closest to the power-receiving conductive pattern of the electronic device 50 from the multiple conductive patterns 310, 320, and 330. The control circuit 12 may control the on/off state of each of the first switch 321, the second switch 322, and the third switch 323 such that a current flows through a selected conductive pattern only, and no current flows through the remaining conductive patterns that are not selected. For example, if the first conductive pattern 310 is selected, the control circuit 12 may control the first switch 321 to reach an on-state and may control the second switch 322 and the third switch 323 to switch to an off-state. This may guarantee that, even if the other ends of the first conductive pattern 310, the second conductive pattern 320, and the third conductive pattern 330 are connected to each other, a current is applied to the first conductive pattern 310 only, and a leak current is prevented from flowing to the second conductive pattern 320 and the third conductive pattern 330.

According to various embodiments, the control circuit 12 may apply an electric signal corresponding to a ping defined by the Qi standard scheme, for example, to each of the multiple conductive patterns 310, 320, and 330 simultaneously or successively. The electronic device 50 may perform in-band type communication by using the ping. For example, the electronic device 50 may perform on/off keying modulation. The electronic device 50 may perform on/off keying modulation corresponding to information defined by the Qi standard scheme, for example, identification information or configuration information. The electronic device 50 may perform on/off keying modulation by conducting a control, for example, such that a resistor or a capacitor connected therein is connected to or disconnected from the power-transmitting conductive pattern.

The control circuit 12 of the wireless power transmission apparatus 10 may detect a change in the magnitude of current or the magnitude of power flowing through at least one of the multiple conductive patterns 310, 320, and 330. More specifically, by changing the impedance in the electronic device 50 according to on/off keying, the magnitude of current or the magnitude of power flowing through at least one of the multiple conductive patterns 310, 320, and 330 may be changed. The wireless power transmission apparatus 10 may select a conductive pattern from which a response signal defined by the Qi standard scheme has been detected. Meanwhile, according to various embodiments of the disclosure, the wireless power transmission apparatus 10 may select a conductive pattern on the basis of a resonance scheme defined by the air fuel alliance (AFA), and this will be described later in more detail. A person skilled in the art could easily understand that the number of windings of each of the conductive patterns 310, 320, and 330 in FIG. 3B and the winding direction thereof are not limited.

Figure 4A:
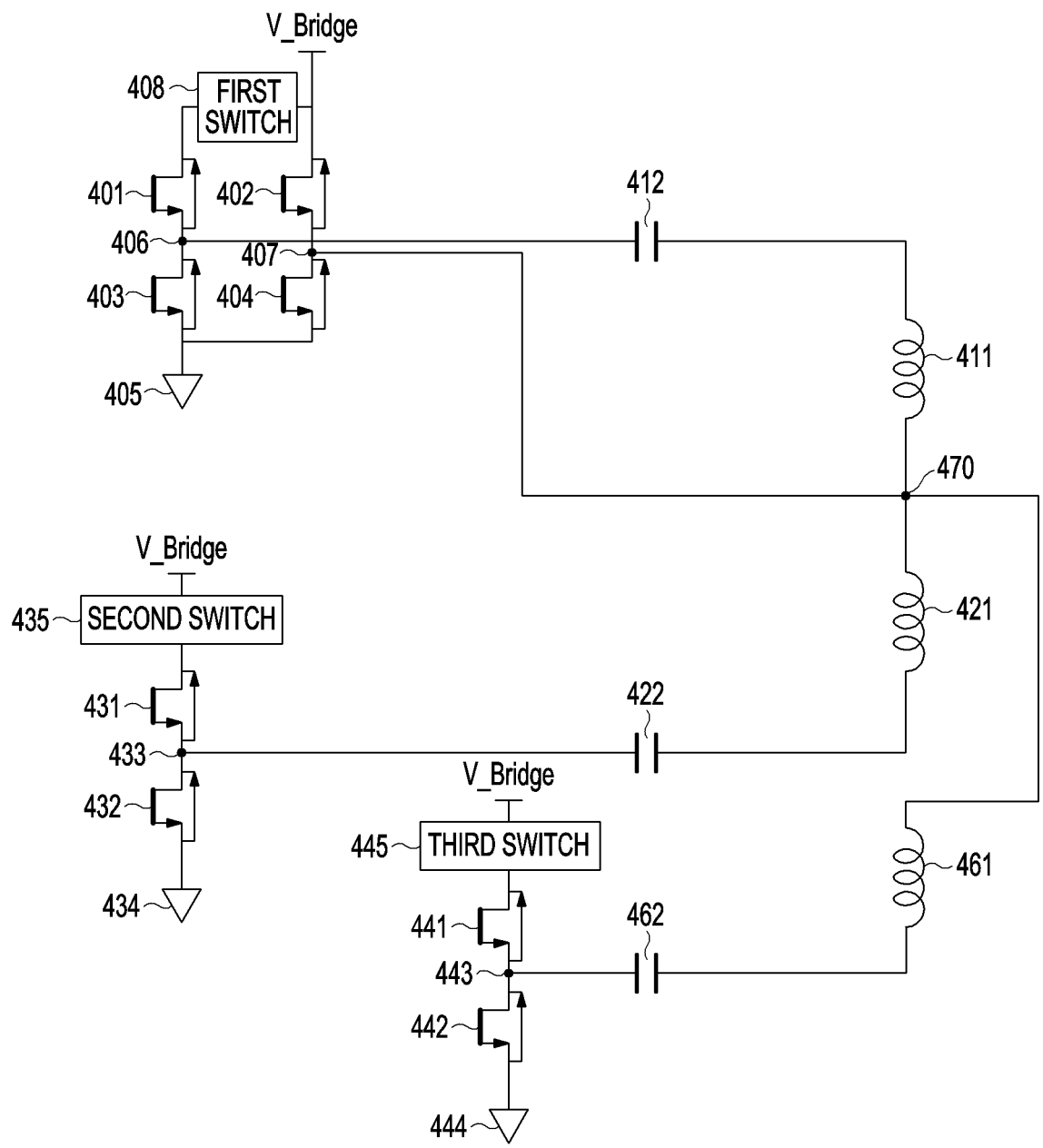
FIG. 4A to FIG. 4C are circuit diagrams of multiple conductive patterns that share at least some of switches for DC-AC conversion according to various embodiments of the disclosure.

FIG. 4A is a circuit diagram of multiple conductive patterns that share at least some of switches for DC-AC conversion according to various embodiments of the disclosure.

It may be determined, according to the on/off state of the first power application control switch 408, whether a current will be applied to the first conductive pattern 411 or not. It may be determined, according to the on/off state of the second power application control switch 435, whether a current will be applied to the second conductive pattern 421 or not. It may be determined, according to the on/off state of the third power application control switch 445, whether a current will be applied to the third conductive pattern 461 or not. The first switch 408 may selectively connect between the power provision circuit and the first conductive pattern 411, and the first switch 408 may be connected between the power provision circuit and the first conductive pattern 411. The second switch 435 may selectively connect between the power provision circuit and the second conductive pattern 421, and the second switch 435 may be connected between the power provision circuit and the second conductive pattern 421. The third switch 445 may selectively connect between the power provision circuit and the third conductive pattern 461, and the third switch 445 may be connected between the power provision circuit and the third conductive pattern 461.

The first conversion switch 401, the second conversion switch 403, the first shared conversion switch 402, and the second shared conversion switch 404 may be used to convert DC power V_Bridge into first AC power and to provide the same to the first conductive pattern 411. The first conversion switch 401, the second conversion switch 403, the first shared conversion switch 402, and the second shared conversion switch 404 may be connected to one another so as to constitute a bridge circuit. Since a DC current can be converted into an AC current according to control of the on/off state of the first conversion switch 401, the second conversion switch 403, the first shared conversion switch 402, and the second shared conversion switch 404, these switches may be referred to as conversion switches. Since the second conductive pattern 421 and the third conductive pattern 461 also receive an AC-converted current from the first shared conversion switch 402 and the second shared conversion switch 404, these switches may be referred to as shared conversion switches. One end of the first conductive pattern 411 may be connected to a common port 470, and the same may be connected to a first node 407 between the first shared conversion switch 402 and the second shared conversion switch 404. The other end of the first conductive pattern 411 may be connected to a second node 406 between the first conversion switch 401 and the second conversion switch 403. A first capacitor 412 may be connected between the second node 406 and the first conductive pad 411, and the first capacitor 412 may constitute, together with the first conductive pattern 411, a resonance circuit having a resonance frequency (for example, 100 to 205 kHz) defined by the Qi standard scheme, for example. The second conversion switch 403 and the second shared conversion switch 404 may be connected to the ground 405. Control of the on/off state of the first conversion switch 401, the second conversion switch 403, the first shared conversion switch 402, and the second shared conversion switch 404 will be described in more detail with reference to FIG. 5.

The third conversion switch 431, the fourth conversion switch 432, the first shared conversion switch 402, and the second shared conversion switch 404 may constitute a bridge circuit. One end of the second conductive pattern 421 may be connected to the common port 470, and the same may be connected to the first node 407 between the first shared conversion switch 402 and the second shared conversion switch 404. The other end of the second conductive pattern 421 may be connected to a third node 433 between the third conversion switch 431 and the fourth conversion switch 432. A second capacitor 422 may be connected between the third node 433 and the second conductive pad 421, and the second capacitor 422 may constitute, together with the second conductive pattern 421, a resonance circuit having a resonance frequency (for example, 100 to 205 kHz) defined by the Qi standard scheme, for example. The fourth conversion switch 432 may be connected to the ground 434. A DC current may be converted into an AC current according to the on/off state of the third conversion switch 431, the fourth conversion switch 432, the first shared conversion switch 402, and the second shared conversion switch 404, and may be provided to the second conductive pattern 421.

The fifth conversion switch 441, the sixth conversion switch 442, the first shared conversion switch 402, and the second shared conversion switch 404 may constitute a bridge circuit. One end of the third conductive pattern 461 may be connected to the common port 470, and the same may be connected to the first node 407 between the first shared conversion switch 402 and the second shared conversion switch 404. The other end of the third conductive pattern 461 may be connected to a fourth node 443 between the fifth conversion switch 441 and the sixth conversion switch 442. A third capacitor 462 may be connected between the fourth node 443 and the third conductive pad 461, and the third capacitor 462 may constitute, together with the third conductive pattern 461, a resonance circuit having a resonance frequency (for example, 100 to 205 kHz) defined by the Qi standard scheme, for example. The sixth conversion switch 442 may be connected to the ground 444. A DC current may be converted into an AC current according to the on/off state of the fifth conversion switch 441, the sixth conversion switch 442, the first shared conversion switch 402, and the second shared conversion switch 404 and may be provided to the third conductive pattern 431. Accordingly, for the sake of DC-AC conversion of the current applied to the three conductive patterns 411, 421, and 461, the wireless power transmission apparatus 10 may include a total of eight switches 401, 402, 403, 404, 431, 432, 441, and 442. Each of the conversion switches 401, 402, 403, 404, 431, 432, 441, and 442 may be implemented as a P-MOS- FET or an N-MOSFET, for example. The power application control switches 408, 435, and 445 may be implemented as P-MOSFETs, for example. A person skilled in the art could easily understand that the type of the conversion switches 401, 402, 403, 404, 431, 432, 441, and 442 and the power application control switches 408, 435, and 445 is not limited as long as the same can be controlled to switch to on/off states.

Figure 4B:
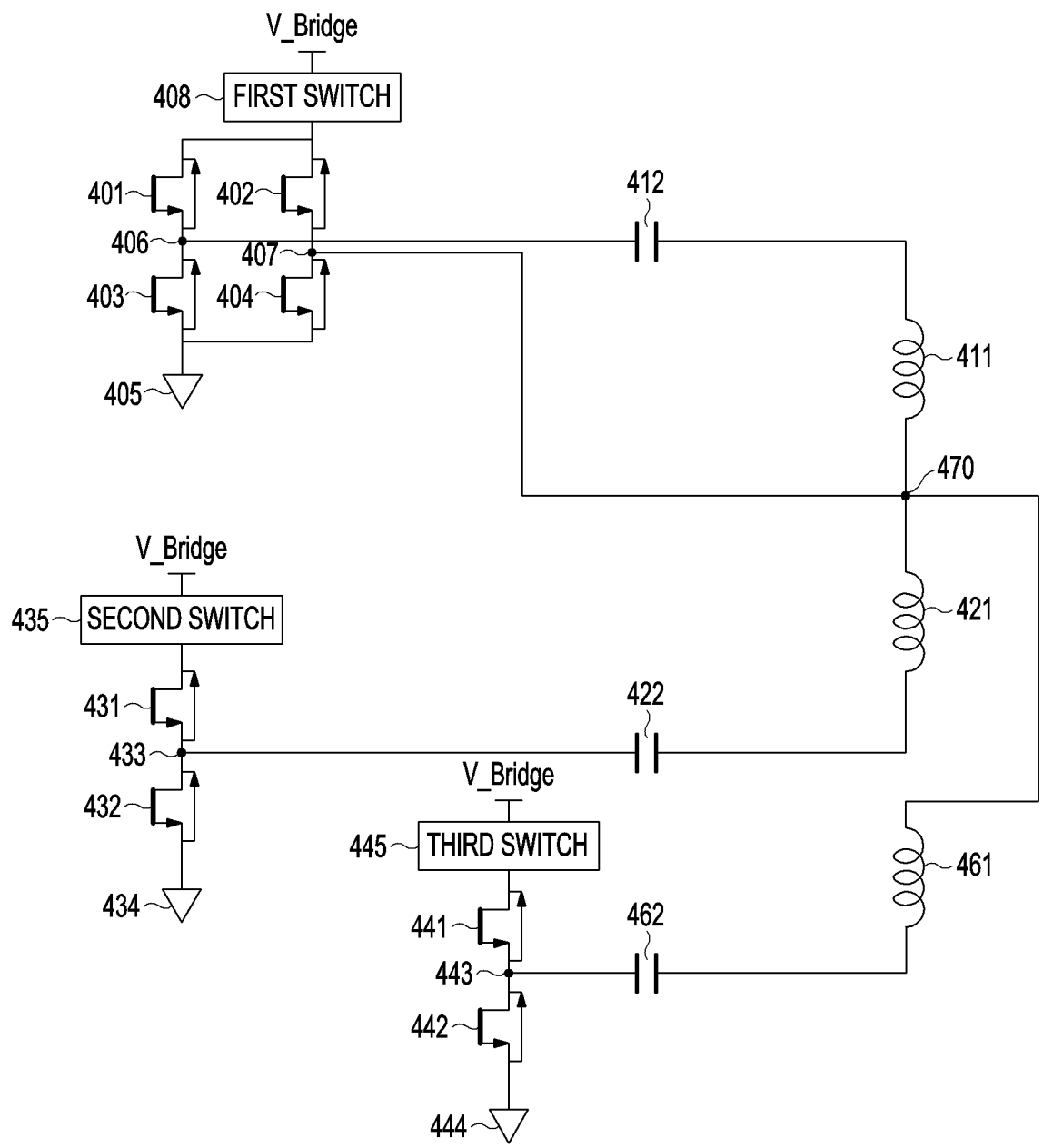

FIG. 4B is a circuit diagram of multiple conductive patterns that share at least some of switches for DC-AC conversion according to various embodiments of the disclosure.

In the embodiment of FIG. 4B, the position of arrangement of the first switch 408 may differ compared with the embodiment of FIG. 4A. In the embodiment of FIG. 4B, the first switch 408 may selectively connect the first conversion switch 401 and the DC power V_Bridge and may also connect the DC power V_Bridge and the first shared conversion switch 402. In this case, the first switch 408 may be controlled to switch to an on-state when applying power to at least one of the first conductive pattern 411, the second conductive pattern 421, and the third conductive pattern 461. For example, when power is applied to the second conductive pattern 421, the DC power V_Bridge may be converted into AC power through control of the on/off state of the first shared conversion switch 402, the second shared conversion switch 404, the third conversion switch 431, and the fourth conversion switch 432. In this case, the first switch 408 and the second switch 435 may be controlled to switch to an on-state, and the third switch 445 may be controlled to switch to an off-state.

The first switch 408 may also be controlled to switch to an off-state when no power is applied to any of the first conductive pattern 411, the second conductive pattern 421, and the third conductive pattern 461.

Figure 4C:
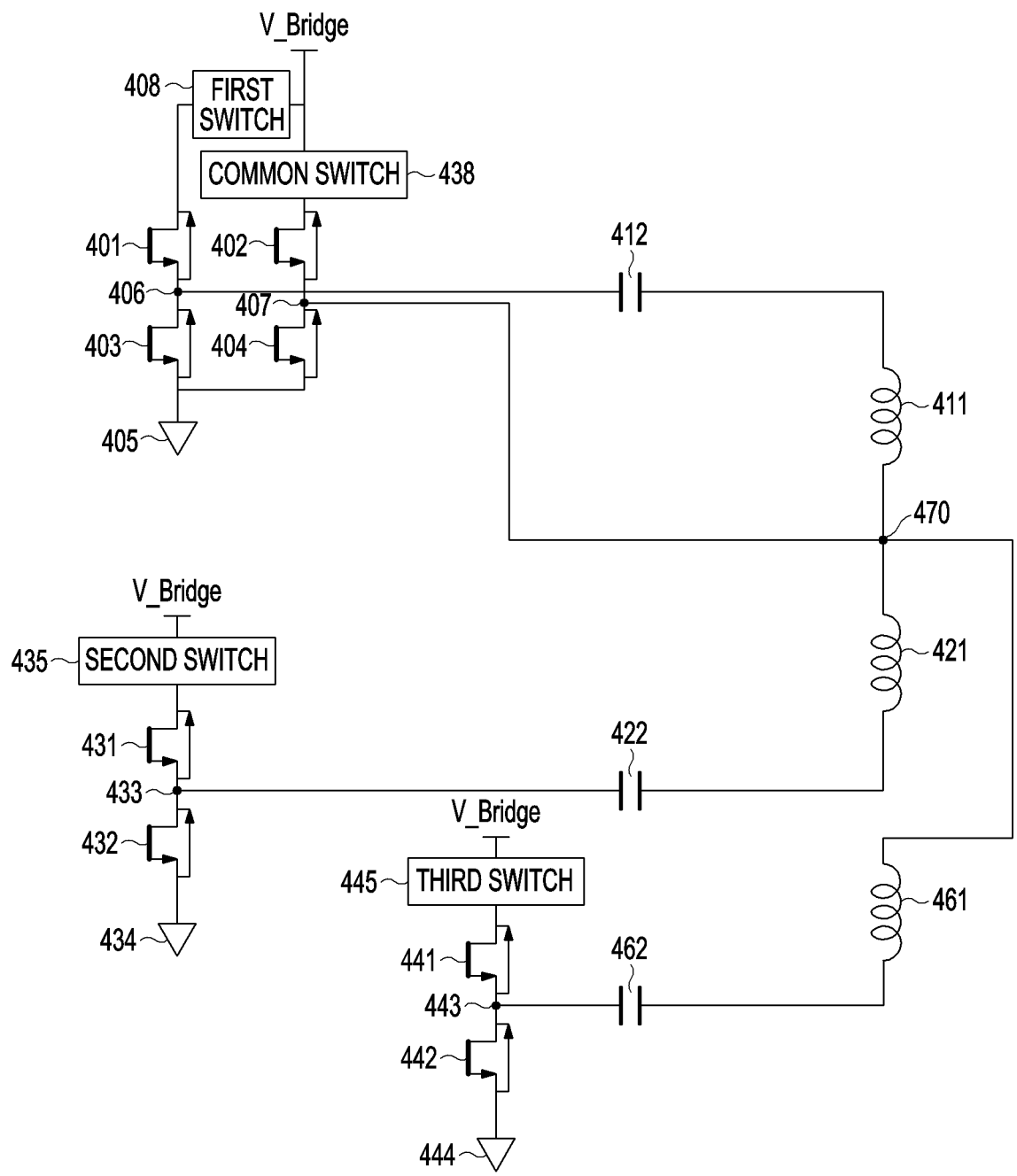

FIG. 4C is a circuit diagram of multiple conductive patterns that share at least some of switches for DC-AC conversion according to various embodiments of the disclosure.

The embodiment of FIG. 4C may further include a common switch 438 compared with the embodiment of FIG. 4A. The common switch 438 may selectively connect the DC power V_Bridge and the first shared conversion switch 402 and may be implemented as a P-MOSFET, for example. The common switch 438 may be controlled to switch to an on-state when power is applied to at least one of the first conductive pattern 411, the second conductive pattern 421, and the third conductive pattern 461. For example, when power is applied to the second conductive pattern 421, the DC power V_Bridge may be converted into AC power through control of the on/off state of the first shared conversion switch 402, the second shared conversion switch 404, the third conversion switch 431, and the fourth conversion switch 432, and may be provided to the second conductive pattern 421. In this case, the common switch 438 and the second switch 435 may be controlled to switch to an on-state, and the first switch 408 and the third switch 445 may be controlled to switch to an off-state.

The common switch 438 may also be controlled to switch to an off-state when no power is applied to any of the first conductive pattern 411, the second conductive pattern 421, and the third conductive pattern 461.

Figure 5:
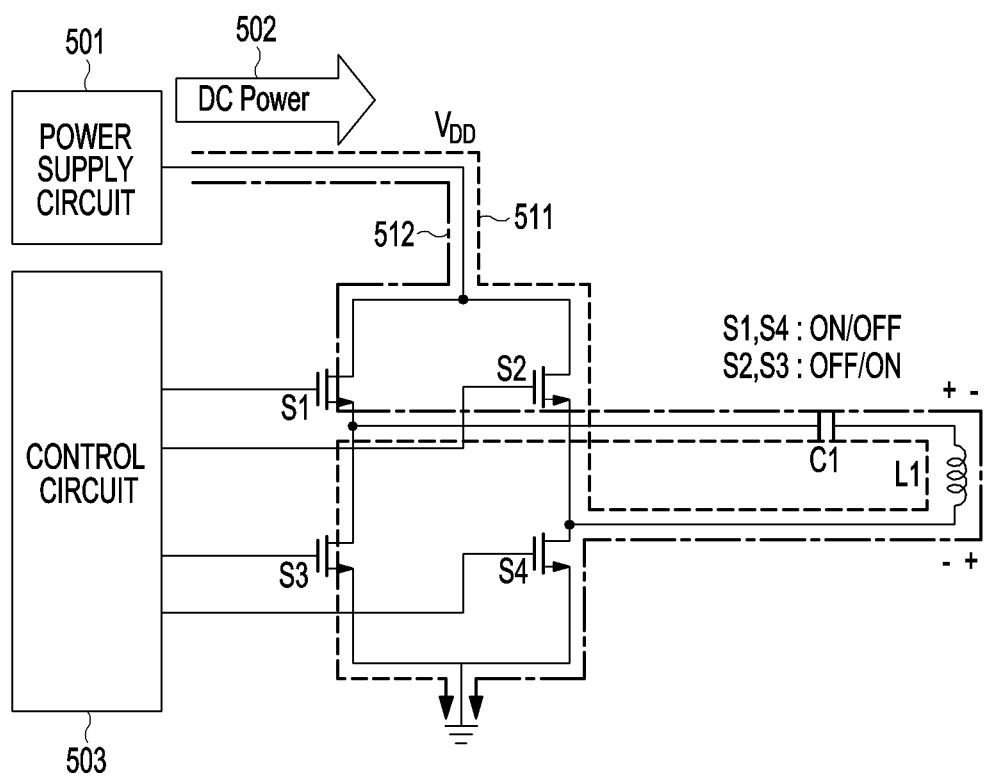
FIG. 5 is a circuit diagram illustrating the operation of a bridge circuit.

FIG. 5 is a circuit diagram illustrating the operation of a bridge circuit.

The power supply circuit 501 may provide DC power 502. The power supply circuit 501 may regulate power received from the outside or power received from an internal power storage device, such as a battery, to be linear and then provide the same. The power supply circuit 501 may provide DC power 502 having the voltage of VDD, for example. Since the power supply circuit is capable of providing DC power, the same may be referred to as power provision circuit. Alternatively, the power adapter may be referred to as a power provision circuit.

The control circuit 503 may control the on/off state of multiple switches S1 to S4. The multiple switches S1 to S4 may constitute a bridge circuit and may be, for example, the first conversion switch 401, the second conversion switch 403, the first shared conversion switch 402, and the second shared conversion switch 404 in FIG. 4. In this case, the conductive pattern L1 of FIG. 5 may be the first conductive pattern 411 in FIG. 4. Alternatively, the multiple switches S1 to S4 may be the third conversion switch 431, the fourth conversion switch 432, the first shared conversion switch 402, and the second shared conversion switch 404 in FIG. 4. In this case, the conductive pattern L1 of FIG. 5 may be the second conductive pattern 421 in FIG. 4.

The control circuit 503 may be, for example, the control circuit 12 in FIG. 1. The control circuit 503 may check the frequency of AC current for power transmission. On the basis of the checked frequency of the AC current, the control circuit 503 may control the first switch S1 and the fourth switch S4 to switch to an on-state during a first period and may simultaneously control the second switch S2 and the third switch S3 to switch to an off-state. A first current 511 may flow to the conductive pattern L1 during the first period. On the basis of the checked frequency of the AC current, the control circuit 503 may control the first switch S1 and the fourth switch S4 to switch to an off-state during a second period and may simultaneously control the second switch S2 and the third switch S3 to switch to an on-state. A second current 512 may flow to the conductive pattern L1 during the second period, and the first current 511 and the second current 512 may flow in opposite directions. The current or voltage flowing to the conductive pattern L1 may change as time elapses, and AC power may be accordingly provided to the conductive pattern L1. The capacitor C1 may constitute a resonance circuit together with the conductive pattern L1. The on/off frequency of the first switch S1 to the fourth switch S4 may be configured so as to correspond to the frequency of the AC current for power transmission.

Figure 6:
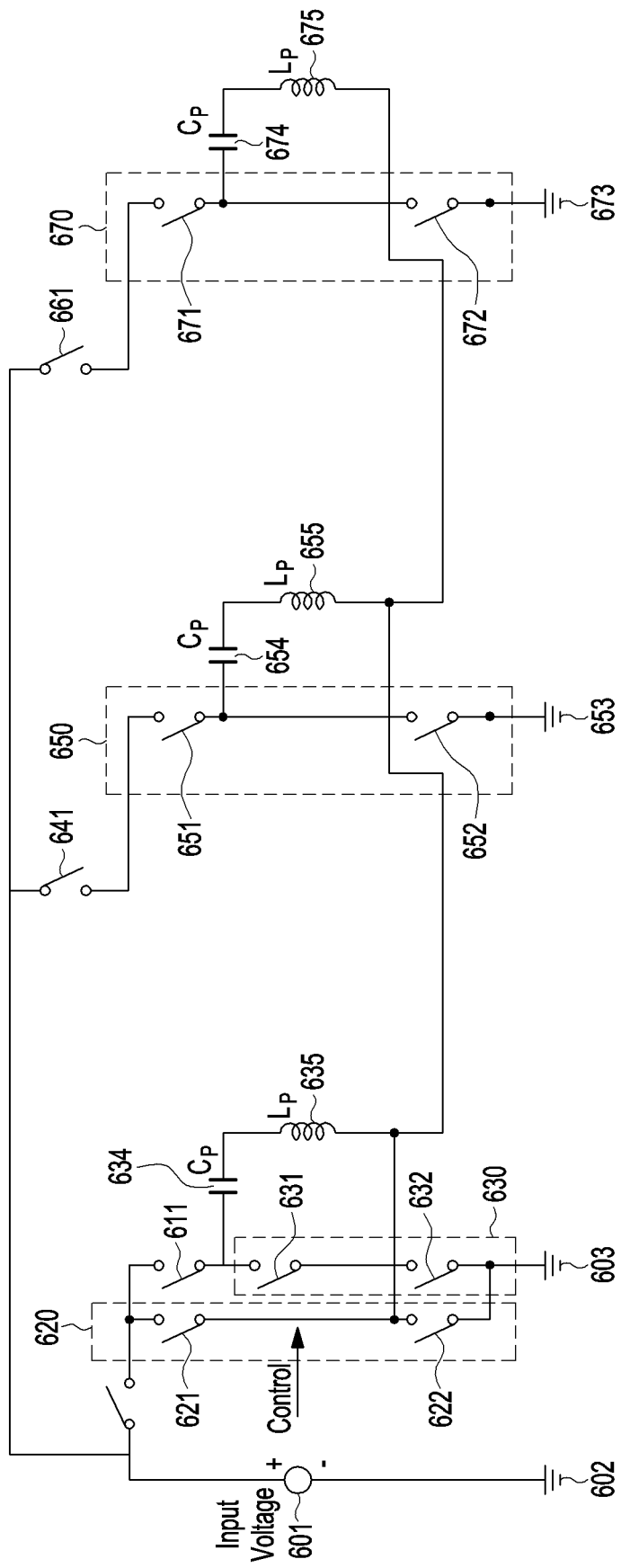
FIG. 6 is a circuit diagram of a wireless power transmission apparatus having three conductive patterns according to various embodiments of the disclosure.

FIG. 6 is a circuit diagram of a wireless power transmission apparatus having three conductive patterns according to various embodiments of the disclosure.

Referring to FIG. 6, the power provision circuit 601 may provide DC power from one end thereof, and the other end thereof may be connected to the ground 602. The DC power from the power provision circuit 601 may have an input voltage. The power provision circuit 601 may be connected to a first power application control switch 611, a second power application control switch 641, and a third power application control switch 661. Although not illustrated, a control circuit (not illustrated) may control the on/off state of the first power application control switch 611, the second power application control switch 641, and the third power application control switch 661. For example, when the first power application control switch 611, the second power application control switch 641, and the third power application control switch 661 are implemented as P-MOSFETs, the control circuit (not illustrated) may control the on/off state of the first power application control switch 611, the second power application control switch 641, and the third power application control switch 661 by adjusting the gate voltage of the P-MOSFETs. For example, the control circuit (not illustrated) may select the first conductive pattern 635 as the conductive pattern to transmit power. The control circuit (not illustrated) may control the first power application control switch 611 connected to the first conductive pattern 635 to switch to an on-state, and may control the second power application control switch 641 and the third power application control switch 661 to switch to an off-state. Since the second power application control switch 641 and the third power application control switch 661 reach a high-impedance state, any flow of a leak current to the second conductive pattern 655 and the third conductive pattern 675 may be prevented.

The multiple first switches 620 may be common conversion switches. The multiple first switches 620 may be connected to one end of the first conductive pattern 635, may be connected to one end of the second conductive pattern 655, and may be connected to one end of the third conductive pattern 675. The multiple second switches 630 may be conversion switches for the first conductive pattern 635. The multiple second switches 630 may be connected to the other end of the first conductive pattern 635. A capacitor 634 may be connected between the other end of the first conductive pattern 635 and the multiple second switches 630 so as to constitute a resonance circuit. The multiple second switches 630 may constitute a bridge circuit together with the multiple first switches 620. For example, when the control circuit (not illustrated) has selected to provide power by using the first conductive pattern 635, the same may control the first shared conversion switch 621 and the second conversion switch 632 to switch to an on-state during a first period and may simultaneously control the second shared conversion switch 622 and the first conversion switch 631 to switch to an off-state. During a second period, the control circuit (not illustrated) may control the first shared conversion switch 621 and the second conversion switch 632 to switch to an off-state and may simultaneously control the second shared conversion switch 622 and the first conversion switch 631 to switch to an on-state. Moreover, after the second period has passed, the control circuit (not illustrated) may again control the first shared conversion switch 621 and the second conversion switch 632 to switch to an on-state and may simultaneously control the second shared conversion switch 622 and the first conversion switch 631 to switch to an off-state. The first period and the second period may be substantially identical, and the length of the first period may be determined according to the frequency of AC power to be generated. The second shared conversion switch 622 and the second conversion switch 632 may be connected to the ground 633.

Multiple third switches 650 may be connected to the other end of the second conductive pattern 655. The multiple third switches 650 may be conversion switches for the second conductive pattern 655. The multiple third switches 650 may be connected to the other end of the second conductive pattern 655. A capacitor 654 may be connected between the other end of the second conductive pattern 655 and the multiple third switches 650 so as to constitute a resonance circuit. The multiple third switches 650 may constitute a bridge circuit together with the multiple first switches 620. The fourth conversion switch 652 may be connected to the ground 653.

The control circuit (not illustrated) may control the first shared conversion switch 621 and the fourth conversion switch 652 to switch to an on-state during a first period and may simultaneously control the second shared conversion switch 622 and the third conversion switch 651 to switch to an off-state. The control circuit (not illustrated) may control the first shared conversion switch 621 and the fourth conversion switch 652 to switch to an off-state during a second period and may simultaneously control the second shared conversion switch 622 and the third conversion switch 651 to switch to an on-state. Accordingly, the multiple first switches 620 and the multiple third switches 650 may convert DC power into AC power and provide the same to the second conductive pattern 655.

Multiple fourth switches 670 may be connected to the other end of the third conductive pattern 675. The multiple fourth switches 670 may be conversion switches for the third conductive pattern 675. The multiple fourth switches 670 may be connected to the other end of the third conductive pattern 675. A capacitor 674 may be connected between the other end of the third conductive pattern 675 and the multiple fourth switches 670 so as to constitute a resonance circuit. The multiple fourth switches 670 may constitute a bridge circuit together with the multiple first switches 620. The sixth conversion switch 672 may be connected to the ground 673.

The control circuit (not illustrated) may control the first shared conversion switch 621 and the sixth conversion switch 672 to switch to an on-state during a first period and may simultaneously control the second shared conversion switch 622 and the fifth conversion switch 671 to switch to an off-state. The control circuit (not illustrated) may control the first shared conversion switch 621 and the sixth conversion switch 672 to switch to an off-state during a second period and may simultaneously control the second shared conversion switch 622 and the fifth conversion switch 671 to switch to an on-state. Accordingly, the multiple first switches 620 and the multiple fourth switches 670 may convert DC power into AC power and provide the same to the third conductive pattern 675.

Although not illustrated, in various embodiments of the disclosure, a first power application control switch 611 may be arranged between the power provision circuit 601, the first shared conversion switch 621, and the first conversion switch 631. In this case, the first power application control switch 611 may be controlled to switch to an on-state when applying power to at least one of the first conductive pattern 635, the second conductive pattern 655, and the third conductive pattern 675. The first power application control switch 611 may be controlled to switch to an off-state when applying no power to any of the first conductive pattern 635, the second conductive pattern 655, and the third conductive pattern 675.

Alternatively, in various embodiments of the disclosure, a shared switch may be additionally arranged between the power provision circuit 601 and the first shared conversion switch 621. In this case, the shared switch may be controlled to switch to an on-state when applying power to at least one of the first conductive pattern 635, the second conductive pattern 655, and the third conductive pattern 675. The shared switch may be controlled to switch to an off-state when applying no power to any of the first conductive pattern 635, the second conductive pattern 655, and the third conductive pattern 675.

Figure 7:
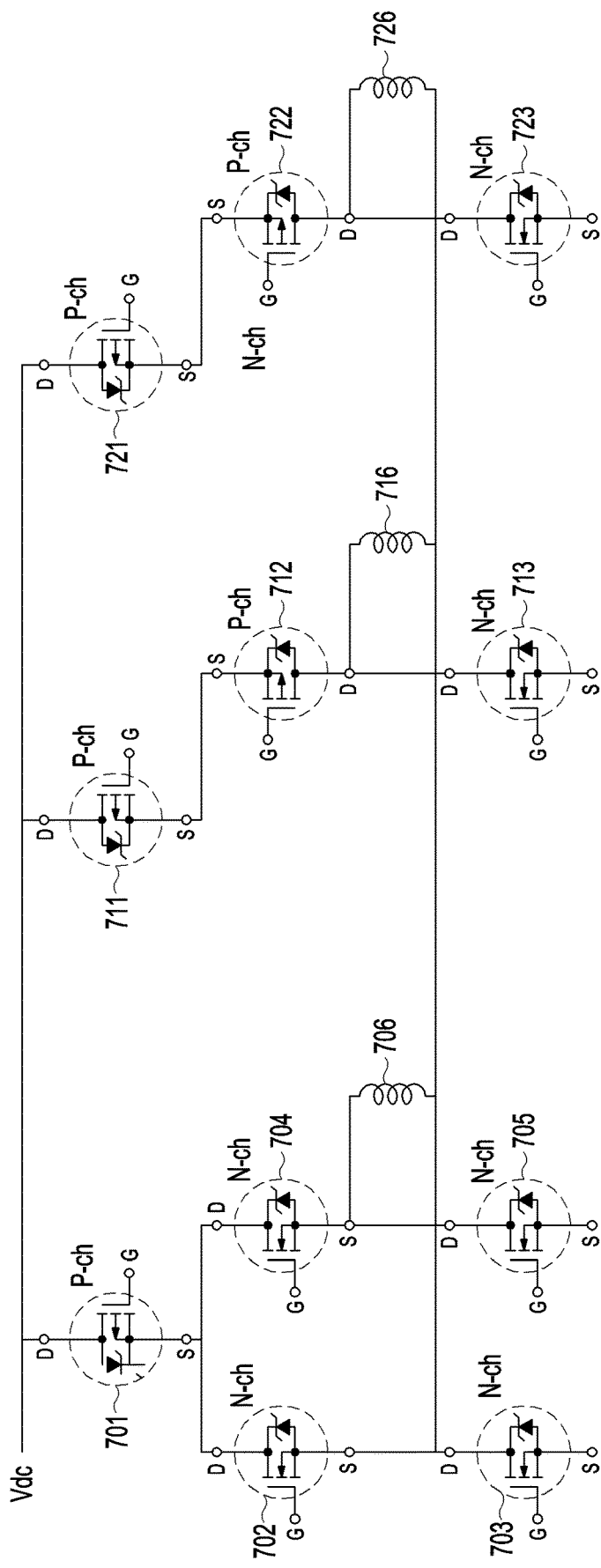
FIG. 7 is a conceptual diagram illustrating FET arrangement according to various embodiments of the disclosure.

FIG. 7 is a conceptual diagram illustrating FET arrangement according to various embodiments of the disclosure. Referring to FIG. 7, the first power application control switch 701, the second power application control switch 702, and the third power application control switch 703 may be implemented as P-MOSFETs. The drain part of the P-MOFETs of the power application control switches 701, 702, and 703 may be connected to Vdc. Since the drain part is connected to the Vdc side, the same may play the role of a switch that improves the influence of a signal that degrades power applied to a specific conductive pattern from another conductive pattern.

According to various embodiments of the disclosure, at least one of the first power application control switch 701, the second power application control switch 702, or the third power application control switch 703 may be implemented as an N-MOSFET. The first shared conversion switch 702 and the second shared conversion switch 703 may be implemented as N-MOSFETs. In various embodiments of the disclosure, the first shared conversion switch 702 and the second shared conversion switch 703 may also be implemented as P-MOSFETs. The first conversion switch 704 and the second conversion switch 705, which correspond to the first conductive pattern 706, may be implemented as N-MOSFETs. In various embodiments of the disclosure, at least one of the first conversion switch 704 or the second conversion switch 705 may be implemented as a P-MOSFET. The third conversion switch 712, which corresponds to the second conductive pattern 716, may be implemented as a P-MOSFET, and the fourth conversion switch 713 may be implemented as an N-MOSFET. The fifth conversion switch 722, which corresponds to the third conductive pattern 726, may be implemented as a P-MOSFET, and the sixth conversion switch 723 may be implemented as an N-MOSFET.

Although not illustrated, in various embodiments of the disclosure, the first power application control switch 701 may selectively connect DC power Vdc and the first conversion switch 704 only, and the first power application control switch 701 may not be arranged between the DC power Vdc and the first shared conversion switch 702. Alternatively, in various embodiments of the disclosure, the wireless power transmission apparatus may include a first power application control switch 701 that selectively connects the DC power Vdc and the first conversion switch 704 only and a shared switch that selectively connects the DC power Vdc and the first shared conversion switch 702 only.

Figure 8A:
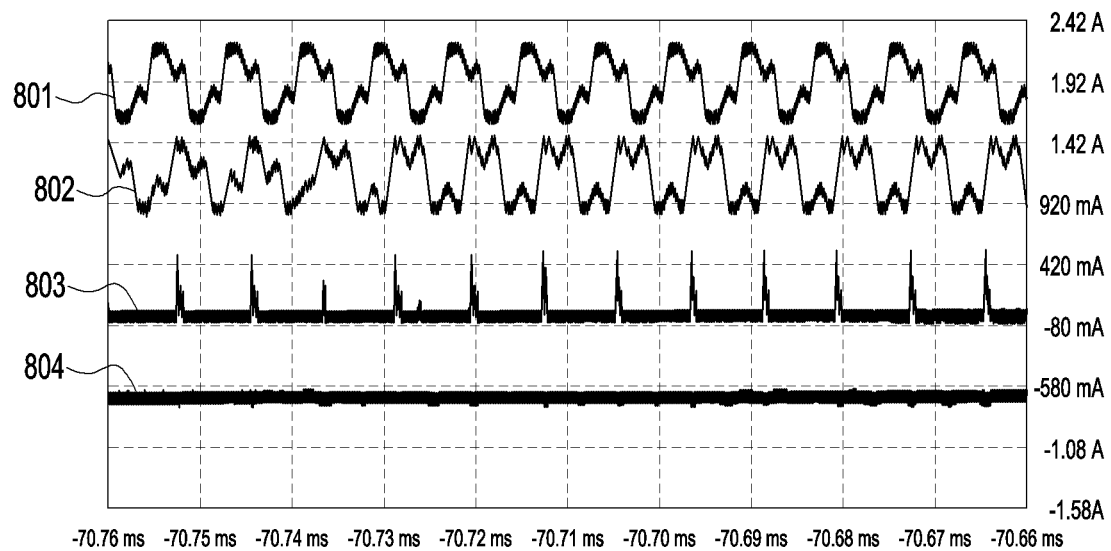
FIG. 8A and FIG. 8B illustrate results of experiments for confirming whether or not a leak current exists in a wireless power transmission apparatus according to various embodiments of the disclosure in connection with an example to be compared with the disclosure.
Figure 8B:
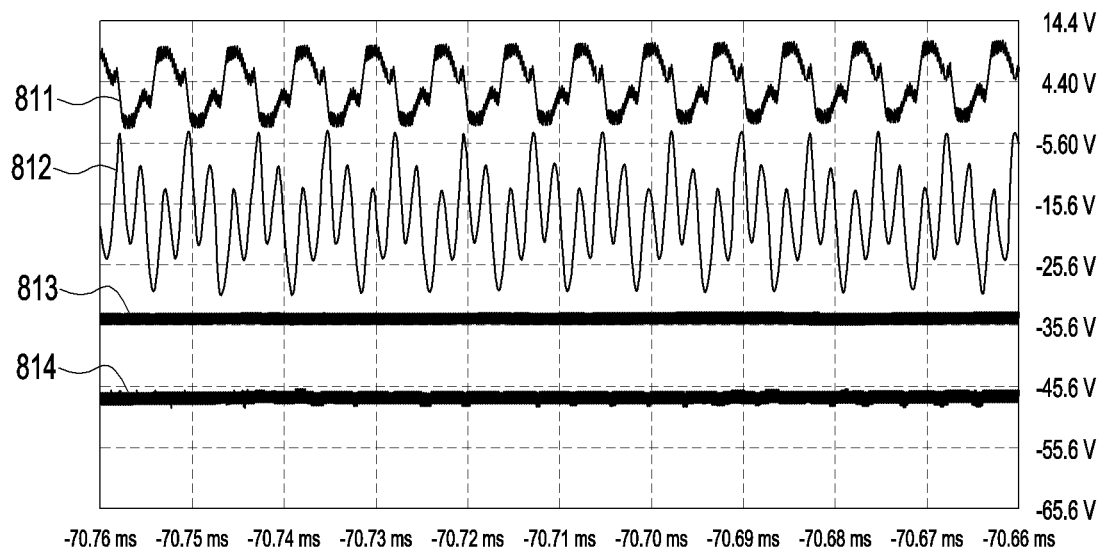

FIG. 8A and FIG. 8B illustrate results of experiments for confirming whether or not a leak current exists in a wireless power transmission apparatus according to various embodiments of the disclosure in connection with an example to be compared with the disclosure. A wireless power transmission apparatus according to a comparative example, which is to be compared with the disclosure, may include no power application control switch. In this case, as in FIG. 8A, the current 801 flowing through the first conductive pattern and the current 802 flowing through the second conductive pattern may have similar waveforms. Particularly, a peak corresponding to a degradation signal current may be detected from the current 803 applied to the conversion switch connected to the second conductive pattern. Reference sign 804 denotes a current at a power application node connected to a conversion switch connected to the second conductive pattern. The wireless power application apparatus according to various embodiments of the disclosure may include a power application control switch (for example, 641 in FIG. 6) connected to the second conductive pattern (for example, 655 in FIG. 6). The current 811 applied to the first conductive pattern (for example, 635 in FIG. 6) and the current 812 applied to the second conductive pattern (for example, 655 in FIG. 6) may have different waveforms. Particularly, a peak corresponding to a leak current may not be detected from the current 813 applied to the conversion switch (for example, 651 in FIG. 6) connected to the second conductive pattern (for example, 655 in FIG. 6). Reference sign 814 denotes a current at the input end of a power provision circuit (for example, 601 in FIG. 6) connected to a conversion switch (for example, 651 in FIG. 6) connected to the second conductive pattern.

Figure 9:
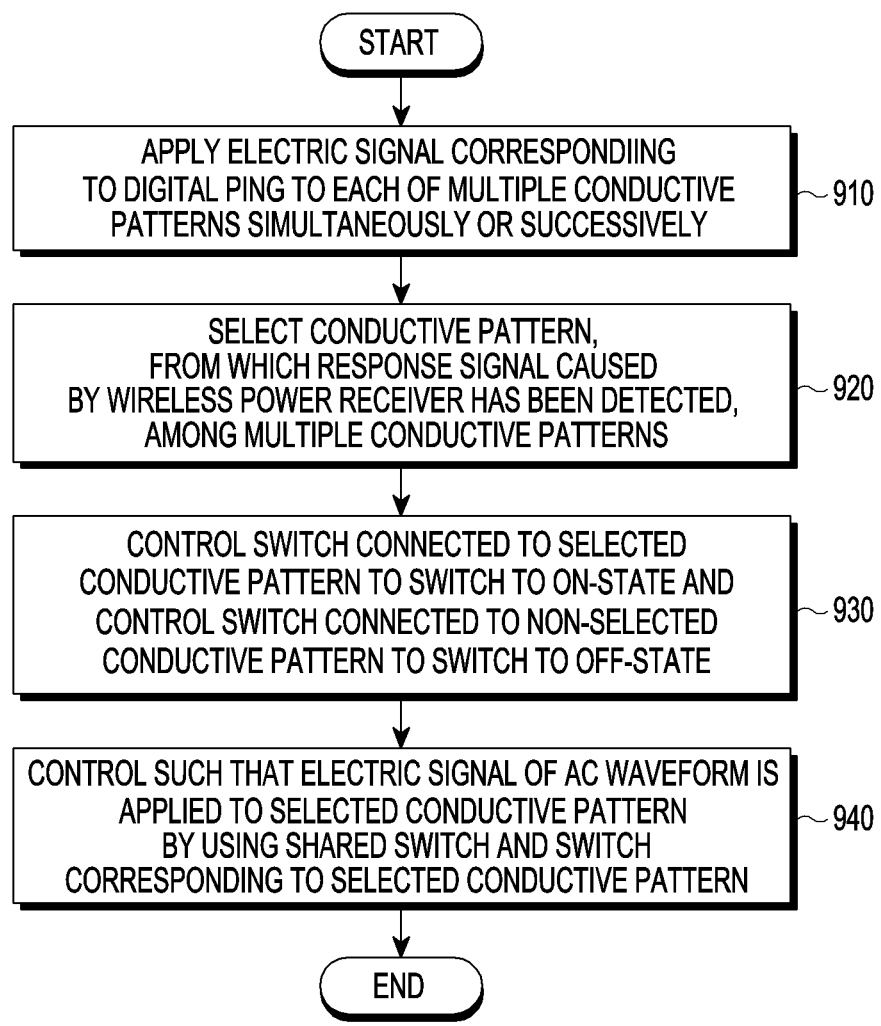
FIG. 9 is a flowchart illustrating a method for operating a wireless power transmission apparatus according to various embodiments of the disclosure.

FIG. 9 is a flowchart illustrating a method for operating a wireless power transmission apparatus according to various embodiments of the disclosure.

In operation 910, the wireless power transmission apparatus 10 (or control circuit 12) may apply an electric signal corresponding to a ping to each of multiple conductive patterns simultaneously or successively. The ping may refer to an application of a power signal for detecting and identifying a defined power receiver. For example, in a selection phase, the wireless power transmission apparatus 10 may determine whether an object exists in a range in which power can be transmitted wirelessly (sensing area) or whether the object has been removed therefrom. The sensing area refers to an area in which an object in the corresponding area can influence the characteristics of power from the wireless power transmission apparatus 10. In an induction type, the sensing area may be the interface surface of the wireless power transmission apparatus 10 and may be a predetermined range in which power can be transferred.

The wireless power transmission apparatus 10 according to various embodiments of the disclosure may detect an electronic device by using the ping. In the selection phase, the process of detecting an electronic device for wirelessly receiving power may be conducted such that, instead of receiving a response from the electronic device by using a power control message, the power conversion unit of the wireless power transmission apparatus 10 or the conductive pattern thereof may sense a change in the magnitude of a voltage or the magnitude of a current, which is for the purpose of forming a wireless power signal thereby determining whether or not an object exists within a predetermined range. The wireless power transmission apparatus 10 in the selection phase may sense the object moving into and out of the sensing area. The wireless power transmission apparatus 10 may attempt to distinguish, among objects within the sensing area, a wireless power reception device to which power can be transferred wirelessly and other objects (for example, keys and coins). If the power transmission apparatus fails to receive sufficient information, the same may repeatedly perform an analog ping and then proceed to an identification and configuration phase.

The wireless power transmission apparatus 10 may sense the position of a wireless power reception device (for example, an electronic device) placed on the upper portion of the interface surface. If the wireless power transmission apparatus 10 includes at least one conductive pattern or supports free positioning, the same may attempt to determine the position of an object. A method may be performed such that, in the detection phase, each conductive pattern is used to confirm whether or not a response to the detection signal is transmitted from the object; alternatively, the identification phase is entered thereafter, and it is confirmed whether or not identification information is transmitted from the object. The wireless power transmission apparatus 10 may determine the conductive pattern to use for wireless power transmission on the basis of the information (position of the wireless power reception device) acquired through the above process. For example, a small amount of current may be supplied to the transmission conductive pattern, and the inductance or impedance of the transmission conductive pattern may be measured through a sensing unit. If the detection process fails a predetermined number of times, the wireless power transmission apparatus 10 may not enter the ping phase until the object placed on the surface of the interface is removed. The wireless power transmission apparatus 10 may sense a change of at least one of the frequency, current, and voltage of the power conversion unit due to the object in the sensing area, thereby detecting the object.

In operation 920, the wireless power transmission apparatus 10 may select a conductive pattern from which a response signal by a wireless power receiver has been detected among the multiple conductive patterns. In operation 930, the wireless power transmission apparatus 10 may control the switch connected to the selected conductive pattern to switch to an on-state, and may control a switch connected to a non-selected conductive pattern to switch to an off-state. The wireless power transmission apparatus 10 may perform a procedure defined by the Qi standard, for example, by using the selected conductive pattern.

The wireless power transmission apparatus 10 performs a process of detecting an electronic device existing in the sensing area through a power control message. Compared with a process of detecting an electronic device by using characteristics and the like of a wireless power signal in a selection phase, the wireless power transmission apparatus 10 may convert the detection process in the ping phase into a digital ping process. The wireless power transmission apparatus 10 according to various embodiments of the disclosure may detect an electronic device on the basis of at least one of an analog ping or a digital ping, and may also select a conductive pattern deemed to have an electronic device arranged thereon, or a conductive pattern to perform charging.

The wireless power transmission apparatus 10 may form a wireless power signal for detecting the electronic device, may send the same to the electronic device, may demodulate the wireless power signal modulated by the electronic device, and may acquire a power control message, which corresponds to a response to the detection signal, from the demodulated wireless power signal. By receiving the power control message corresponding to a response to the detection signal, the wireless power transmission apparatus 10 may recognize the electronic device to which power is to be transmitted. In various embodiments of the disclosure, the wireless power transmission apparatus 10 may perform an operation related to the digital ping with regard to all conductive patterns and may then select a conductive pattern from which a response signal corresponding to the digital ping has been detected.

The detection signal formed by the wireless power transmission apparatus 10 to perform a detection process may be a wireless power signal formed by applying a power signal of a specific operating point for a predetermined time. The operating point may refer to the frequency of a voltage applied to the transmission conductive pattern (Tx coil), the duty cycle thereof, and the amplitude thereof. The wireless power transmission apparatus 10 may generate the detection signal, which is generated by applying a power signal of the specific operating point, for a predetermined time and may transmit the same to the electronic device.

When responding to the detection signal, the wireless power reception device may send a power transmission termination packet or a signal strength packet, which indicates the strength of the power signal received as a response to the detection signal, to the wireless power transmission apparatus. The strength of the power signal inside the message may be used as a value indicating the degree of resonance coupling or induction coupling for power transmission between the wireless power transmission apparatus 10 and the electronic device. For example, it may be determined that the degree of coupling is low when the power received by the wireless power reception device is low compared with the power transmitted by the wireless power transmission apparatus 10.

The wireless power transmission apparatus 10 may extend the digital ping and enter an identification and configuration phase. In order to receive a power control message necessary in the identification and configuration phase, the wireless power transmission apparatus 10 may maintain a power signal of the specific operating point. Meanwhile, when the wireless power transmission apparatus 10 has found no electronic device to which power can be transferred (for example, when there is no response to the power signal), the operating phase of the wireless power transmission apparatus 10 may return to the selection phase. The wireless power transmission apparatus 10 may then enter the identification and configuration phase.

In the identification and configuration phase, the wireless power transmission apparatus 10 may perform operations of identifying the selected wireless power reception device and receiving configuration information. To this end, the wireless power reception device may transmit an identification packet including a message indicating identification information. The identification packet may be configured to include version information, a manufacturing code, a basic device identifier, and the like. The wireless power transmission apparatus 10 may generate a power transfer contract used for power charging with the electronic device on the basis of the identification information or configuration information.

The power transfer contract may include limits of parameters that determine power transfer characteristics in the power transfer phase. The message sent by the wireless power reception device may be configured to include information indicating the version of the contract for wireless power transmission, information for identifying the manufacturer of the electronic device, information indicating whether or not an expanded device identifier exists, and a basic device identifier. When the information indicating whether or not an extended device identifier exits states that the extended device identifier exists, an extended identification packet including the extended device identifier may be transmitted separately. When the extended device identifier is used, information based on the manufacturer identification information, the basic device identifier and the extended device identifier may be used to identify the electronic device. In the identification and configuration phase, the electronic device may transmit a configuration packet as a power control message. The configuration packet may be configured to include a power class, information regarding the expected maximum power, the number of option configuration packets, an indicator indicating a window size for average received power, an indicator indicating a method for determining a current in a major cell of the wireless power reception device 10, and the like. The wireless power transmission apparatus 10 may perform at least a part of the above-mentioned process with regard to multiple conductive patterns simultaneously or successively and may select a conductive pattern, from which a response defined by the standard has been detected, as the conductive pattern to perform charging.

The wireless power transmission apparatus 10 may end the identification and configuration phase in order to find another electronic device before entering a power transfer phase.

In operation 940, the wireless power transmission apparatus 10 may conduct a control such that an electric signal having an AC waveform is applied to the selected conductive pattern by using a shared switch and a switch corresponding to the selected conductive pattern. Any flow of leak current to conductive patterns other than the selected conductive pattern may be prevented.

Figure 10A:
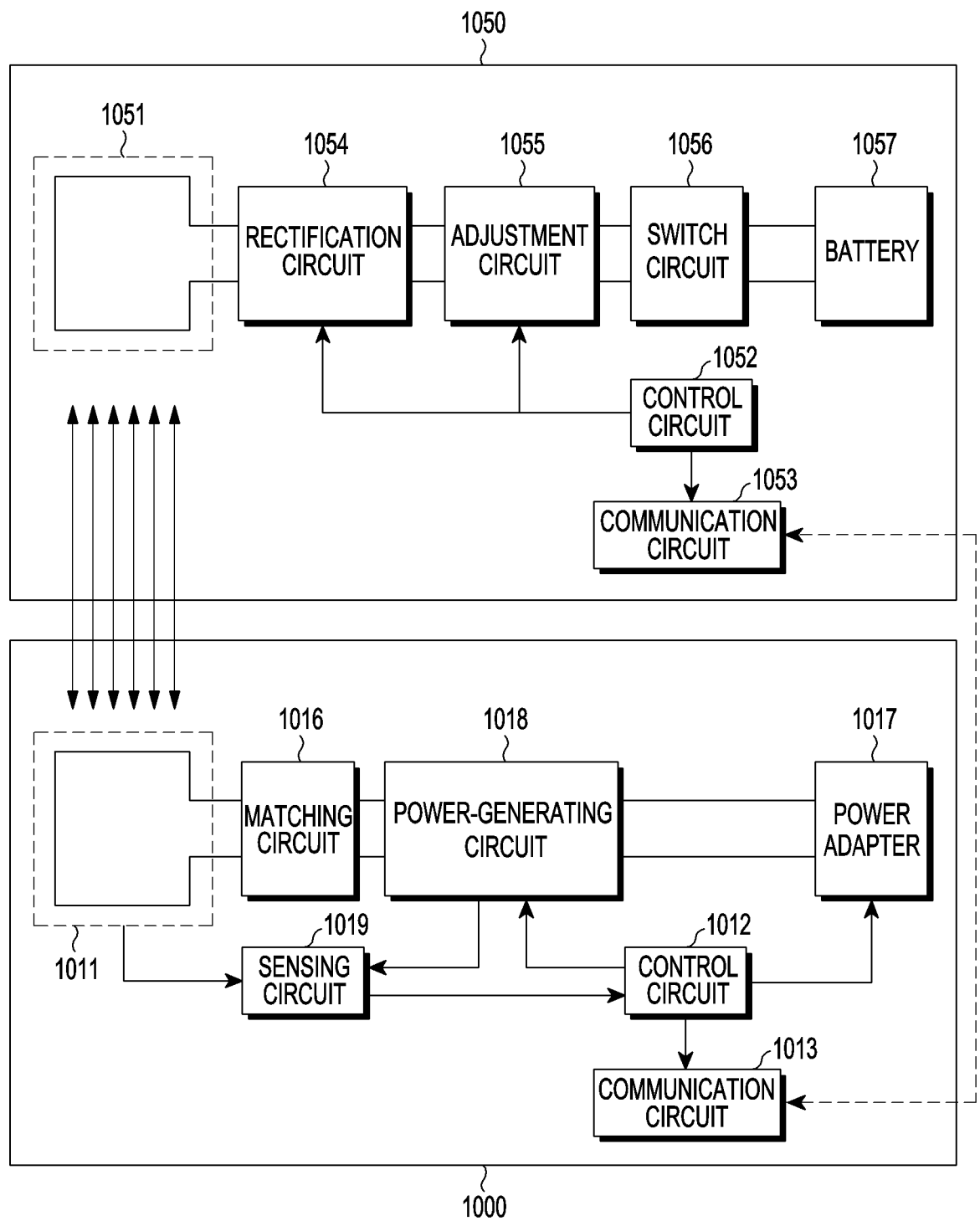
FIG. 10A is a detailed block diagram of an AFA standard-based wireless power transmission apparatus and a wireless power reception device according to various embodiments of the disclosure.

FIG. 10A is a detailed block diagram of a wireless power transmission apparatus and a wireless power reception device according to various embodiments of the disclosure.

As illustrated in FIG. 10A, the wireless power transmission apparatus 1000 may include at least one of a Tx resonator 1011, a control circuit 1012, a communication circuit 1013 (for example, an out-of-band signaling circuit), a matching circuit 1016, a power adapter 1017, a power-generating circuit 1018, or a sensing circuit 1019. The electronic device 1050 may include at least one of an Rx resonator 1051, a control circuit 1052, a communication circuit 1053, a rectification circuit 1054, an adjustment circuit 1055, a switch circuit 1056, or a battery 1057.

The power adapter 1017 may output DC power having a configured voltage value. The voltage value of the DC power output by the power adapter 1017 may be controlled by the control circuit 1012. At least one of the control circuit 1012 or the control circuit 1052 may be implemented as various circuits capable of performing operations, such as a versatile processor (for example, a CPU), a minicomputer, a microprocessor, a micro controlling unit (MCU), and a field programmable gate array (FPGA), and the type thereof is not limited.

The power-generating circuit 1018 may receive a DC current from the power adapter 1017. The power-generating circuit 1018 may amplify the DC current by a configured gain. Alternatively, the DC power may be converted into an AC power on the basis of a signal input from the control circuit 1012. Alternatively, the power-generating circuit 1018 may output AC power. For example, the power-generating circuit 1018 may include an inverter and may convert a DC current into AC power by using the inverter.

The matching circuit 1016 may perform impedance matching. For example, the output power may be controlled to have high efficiency or high output by adjusting the impedance seen from the matching circuit 1016. The matching circuit 1016 may adjust the impedance under the control of the control circuit 1012. The matching circuit 1016 may include at least one of a conductive pattern (coil) or a capacitor. The control circuit 1012 may control the state of connection with at least one of the conductive pattern or the capacitor and may accordingly perform impedance matching. The electronic device 1050 may include a matching circuit (not illustrated) performing an operation similar or identical to that of the matching circuit 1016 of the wireless power transmission apparatus 1000.

The sensing circuit 1019 may sense a load change by the electronic device 1050 through the Tx resonator 1011 or the power-generating circuit 1018. The sensing result by the sensing circuit 1019 may be provided to the control circuit 1012. The electronic device 1050 may include a sensing circuit (not illustrated) performing an operation similar or identical to that of the sensing circuit 1019 of the wireless power transmission apparatus 1000.

The Tx resonator 1011 may transmit the input AC power to the Rx resonator 1051. The Tx resonator 1011 and the Rx resonator 1051 may be implemented as resonance circuits having the same resonance frequency. For example, the resonance frequency may be 6.78 MHz. The Tx resonator 1011 may include a conductive pattern or a capacitor for converting the input AC power into an electromagnetic wave having the resonance frequency. The Rx resonator 1051 may receive power for charging. In various embodiments of the disclosure, the Tx resonator 1011 may include multiple conductive patterns.

The communication circuit 1013 may perform communication with the communication circuit 1053 of the electronic device 1050. For example, the wireless power transmission apparatus 1000 may perform bidirectional communication (WiFi, ZigBee, BT/BLE) at a frequency of 2.4 GHz with the electronic device 1050.

The rectification circuit 1054 may rectify wireless power received from the RX resonator 1051 into DC power. For example, the same may be implemented as a bridge diode.

The adjustment circuit 1055 may convert the rectified power so as to have a configured gain. For example, the adjustment circuit 1055 may convert the rectified power such that the voltage at the output end becomes 5V. Alternatively, the threshold value (for example, minimum value and maximum value) of the voltage that may be applied to the front end of the adjustment circuit 1055 may be configured. Alternatively, the adjustment circuit 1055 may include a DC/DC converter (not illustrated).

The switch circuit 1056 may connect the adjustment circuit 1055 and the battery 1057. The switch circuit 1056 may maintain an on/off state under the control of the control circuit 1052. The switch circuit 1056 may be omitted. The battery 1057 may store converted power, which is input from the adjustment circuit 1055 when the switch circuit 1056 is in an on-state.

The control circuit 1012 may control constituent elements included in the wireless power transmission apparatus 1000. For example, the control circuit 1012 may control the power adapter 1017 to initiate or terminate wireless power transmission.

Figure 10B:
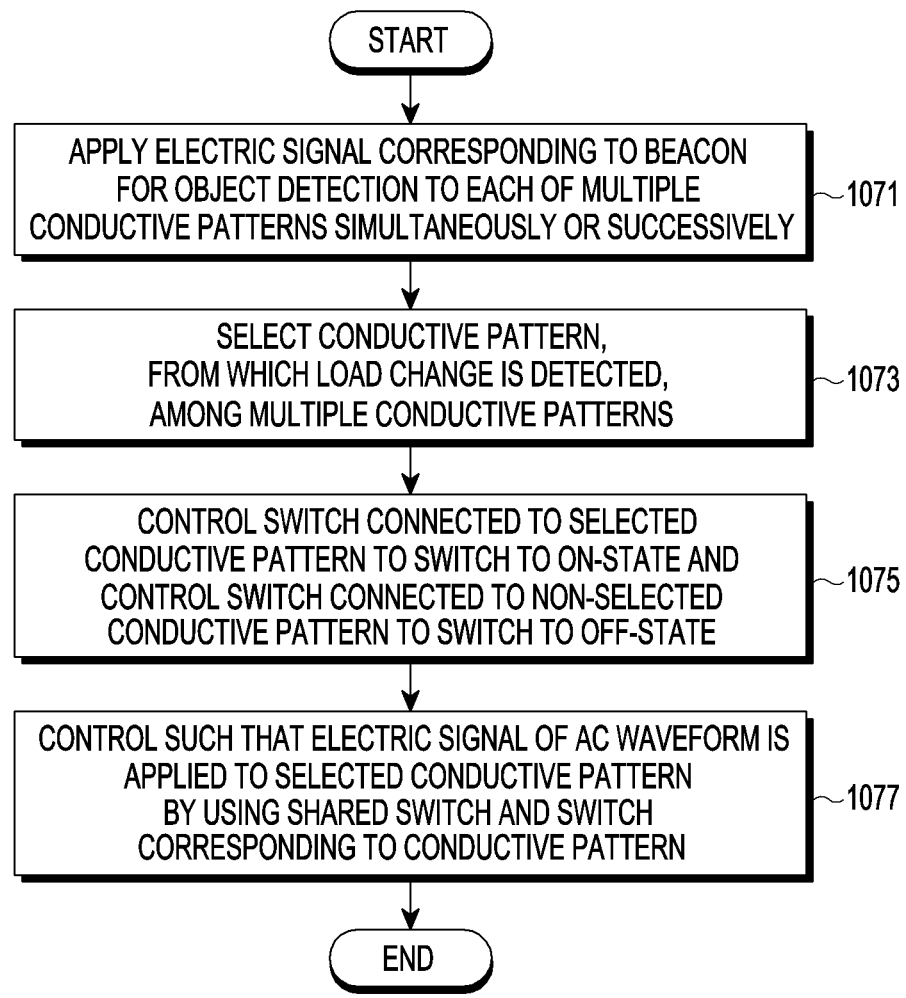
FIG. 10B is a flowchart illustrating a method for operating an AFA standard-based wireless power transmission apparatus according to various embodiments of the disclosure.

FIG. 10B is a flowchart illustrating a method for operating a wireless power transmission apparatus according to various embodiments of the disclosure.

In operation 1017, the wireless power transmission apparatus 1000 (or control circuit 1012) may apply an electric signal corresponding to a beacon for object detection to each of multiple conductive patterns simultaneously or successively. In this regard, the beacon may include at least one of a short beacon for detecting a load change by an object arranged in a charging area, defined by the AFA standard, for example, or a long beacon used to transmit a predetermined signal (for example, advertisement signal in the BLE communication scheme) by the communication circuit 1053 of the electronic device.

In operation 1073, the wireless power transmission apparatus 1000 may select a conductive pattern, from which a load change has been detected, among the multiple conductive patterns. In operation 1030, the wireless power transmission apparatus 1000 may control a switch connected to the selected conductive pattern to switch to an on-state and may control a switch connected to a non-selected conductive pattern to an off-state. The wireless power transmission apparatus 1000 may perform follow-up operations defined by the AFA standard. For example, the wireless power transmission apparatus 1000 may receive an advertisement signal through the communication circuit 1013 and may conduct a control such that a connection request signal is transmitted in response thereto. Accordingly, a BLE connection may be established between the wireless power transmission apparatus 1000 and the electronic device 1050. The wireless power transmission apparatus 1000 may transmit/receive a PTU static signal and a PRU static signal and may receive a PRU dynamic signal.

In operation 1075, the wireless power transmission apparatus 1000 may conduct a control such that an electric signal having an AC waveform is applied to the selected conductive pattern by using a shared switch and a switch corresponding to the selected conducive pattern. This may prevent application of a leak current to the remaining conductive patterns that are not selected. The wireless power transmission apparatus 1000 may transmit a control signal (PRU control) that instructs a charge start to the electronic device 1050. The electronic device 1050 may turn on the switch circuit 1056 in response to reception of the control signal and may accordingly charge the battery 1057. Although not illustrated, a charger (not illustrated) may be additionally arranged between the switch circuit 1056 and the battery 1057, and the charger may charge the battery 1057 in a predetermined mode (for example, constant current (CC) mode or constant voltage (CV) mode).

Figure 11:
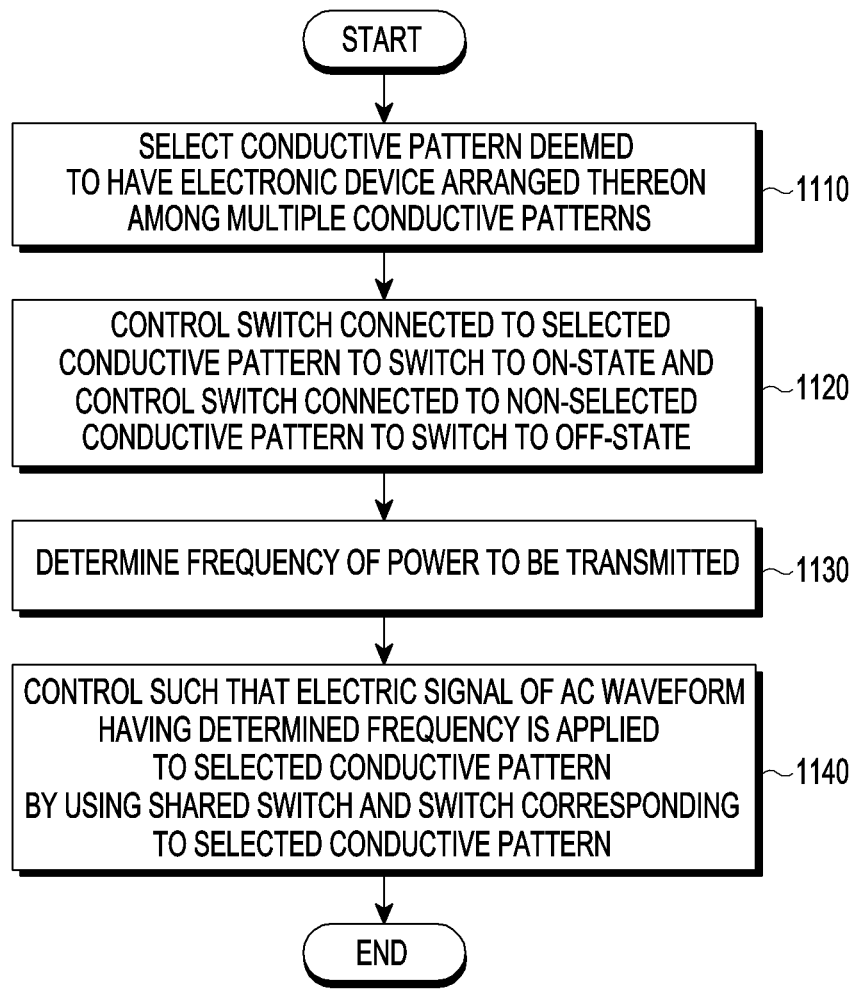
FIG. 11 is a flowchart illustrating a method for operating a wireless power transmission apparatus according to various embodiments of the disclosure.

FIG. 11 is a flowchart illustrating a method for operating a wireless power transmission apparatus according to various embodiments of the disclosure.

In operation 1110, the wireless power transmission apparatus (or the control circuit included in the wireless power transmission apparatus) may select a conductive pattern, which is deemed to have an electronic device arranged thereon, among multiple conductive patterns. As described above, the wireless power transmission apparatus may select a conductive pattern deemed to have an electronic device arranged thereon according to a scheme defined by the Qi standard or a scheme defined by the AFA standard. Alternatively, the wireless power transmission apparatus may include various arrangement sensing circuits capable of detecting physical arrangements, such as Hall sensing circuits, so as to correspond to the multiple conductive patterns, respectively, and may select a conductive pattern deemed to have an electronic device arranged thereon on the basis of data from the arrangement sensing circuits. A person skilled in the art could easily understand that the method for detecting an electronic device by the wireless power transmission apparatus is not limited, and the method for selecting a conductive pattern, which is deemed to have an electronic device arranged thereon, among the multiple conductive patterns by the wireless power transmission apparatus is accordingly not limited either.

In operation 1120, the wireless power transmission apparatus may control a switch connected to the selected conductive pattern to switch to an on-state, and may control a switch connected to a non-selected conductive pattern to switch to an off-state. Accordingly, the wireless power transmission apparatus may prevent a flow of leak current to conductive patterns other than the selected conductive pattern.

In operation 1130, the wireless power transmission apparatus may determine the frequency of power to be transmitted. For example, an AC frequency for power transmission defined by a standard according to a charging scheme may be defined, and the wireless power transmission apparatus may determine the corresponding frequency. In operation 1140, the wireless power transmission apparatus may conduct a control such that an electric signal of an AC waveform, which has the determined frequency, is applied to the selected conductive pattern by using a shared switch and a switch corresponding to the selected conductive pattern.

Figure 12:
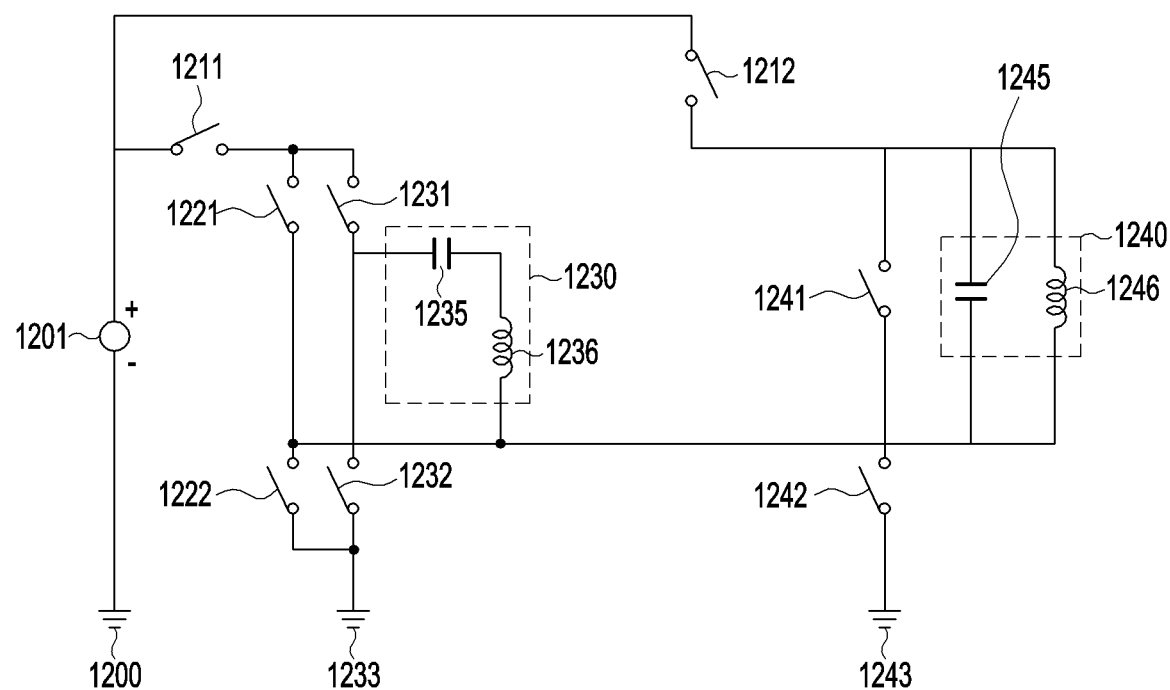
FIG. 12 is a circuit diagram of a wireless power transmission apparatus supporting multiple wireless charging standard schemes according to various embodiments of the disclosure.

FIG. 12 is a circuit diagram of a wireless power transmission apparatus supporting multiple wireless charging standard schemes according to various embodiments of the disclosure.

One end of the power provision circuit 1201 may be connected to the ground 1200, and the same may provide DC power. The power provision circuit 1201 may supply power to at least one of the first conductive pattern 1236 or the second conductive pattern 1246. A first power application control switch 1211 may be connected between the power provision circuit 1201 and the first conductive pattern 1236 such that the power provision circuit 1201 and the first conductive pattern 1236 can be connected selectively. A second power application control switch 1212 may be connected between the power provision circuit 1201 and the second conductive pattern 1246 such that the power provision circuit 1201 and the second conductive pattern 1246 can be connected selectively.

The first shared conversion switch 1221, the second shared conversion switch 1222, the first conversion switch 1231, and the second conversion switch 1232 may constitute a bridge circuit. One end of the second shared conversion switch 1222 and one end of the second conversion switch 1232 may be connected to the ground 1233. The first capacitor 1235 may constitute a first resonance circuit 1230 together with the first conductive pattern 1236. The first resonance circuit 1230 may have a resonance frequency of 100 to 205 kHz defined by the Qi standard, for example. The control circuit (not illustrated) may convert the input DC power into AC power having a determined frequency, for example, a frequency in the range of 100 to 205 kHz, by controlling the on/off state of the first shared conversion switch 1221, the second shared conversion switch 1222, the first conversion switch 1231, and the second conversion switch 1232. The converted AC power may be provided to the first resonance circuit 1230. In this case, the on/off cycle of the first shared conversion switch 1221 and the second shared conversion switch 1222 may be configured so as to correspond to a frequency in the range of 100 to 205 kHz.

The first shared conversion switch 1221, the second conversion switch 1222, the third conversion switch 1241, and the fourth conversion switch 1242 may constitute a bridge circuit. One end of the second shared conversion switch 1222 and one end of the fourth conversion switch 1242 may be connected to the ground 1243. The second capacitor 1245 may constitute a second resonance circuit 1240 together with the second conductive pattern 1246. The second resonance circuit 1240 may have a resonance frequency of 6.78 MHz defined by the AFA standard, for example. The control circuit (not illustrated) may convert the input DC power into AC power having a determined frequency, for example, a frequency of 6.78 MHz, by controlling the on/off state of the first shared conversion switch 1221, the second shared conversion switch 1222, the third conversion switch 1241, and the fourth conversion switch 1242. The converted AC power may be provided to the second resonance circuit 1240. In this case, the on/off cycle of the first shared conversion switch 1221 and the second shared conversion switch 1222 may be configured so as to correspond to a frequency of 6.78 MHz. The wireless power transmission apparatus according to various embodiments of the disclosure may differently configure the on/off cycle of the shared conversion switches according to the determined charging scheme.

Although not illustrated, in various embodiments of the disclosure, the first power application control switch 1211 may selectively connect the power provision circuit 1201 and the first conversion switch 1231 only, and the first power application control switch 1211 may not be arranged between the power provision circuit 1201 and the first shared conversion switch 1221. Alternatively, in various embodiments of the disclosure, the wireless power transmission apparatus may include a first power application control switch 1211 that selectively connects the power provision circuit 1201 and the first conversion switch 1231 only and a shared switch that selectively connects the power provision circuit 1201 and the first shared conversion switch 1221 only.

Figure 13:
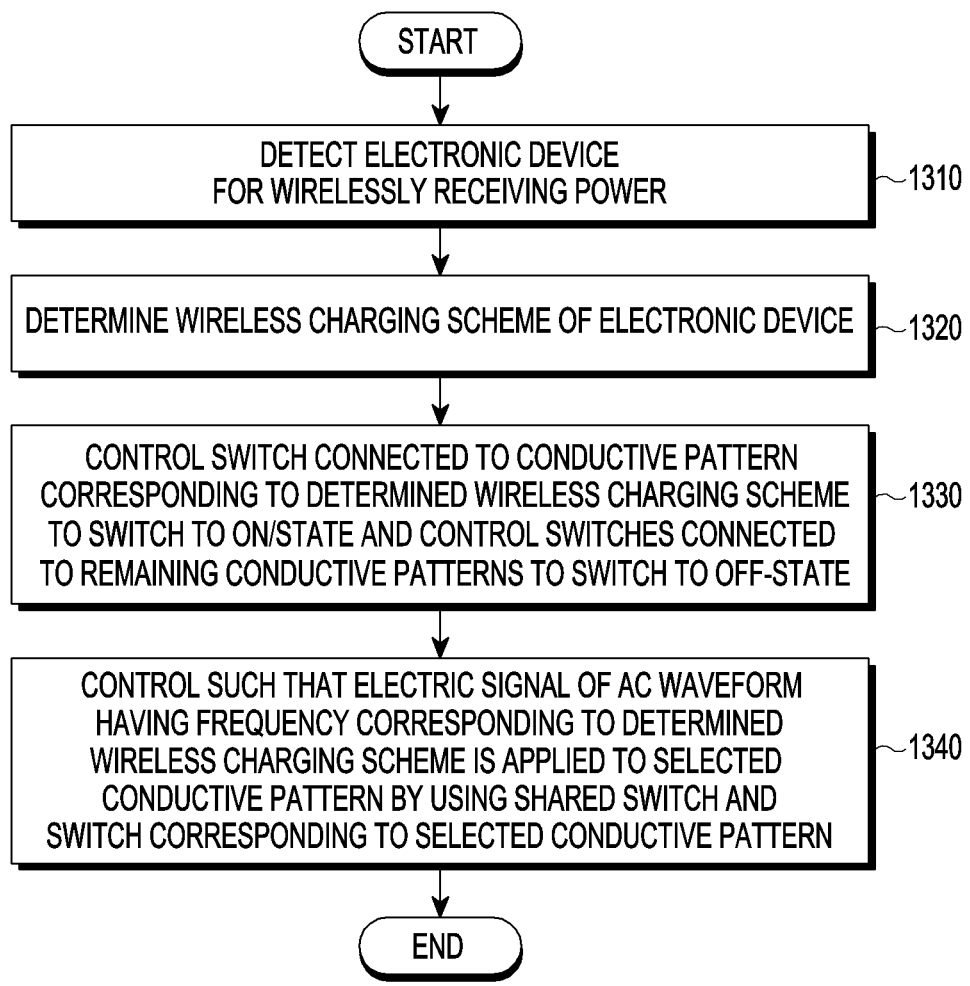
FIG. 13 is a flowchart illustrating a method for operating a wireless power transmission apparatus according to various embodiments of the disclosure.

FIG. 13 is a flowchart illustrating a method for operating a wireless power transmission apparatus according to various embodiments of the disclosure.

In operation 1310, the wireless power transmission apparatus (or the control circuit include in the wireless power transmission apparatus) may detect an electronic device for wirelessly receiving power. The wireless power transmission apparatus may detect the electronic device according to a procedure defined by various charging schemes. In operation 1320, the wireless power transmission apparatus may determine the wireless charging scheme of the electronic device.

In operation 1330, the wireless power transmission apparatus may control a switch connected to a conductive pattern corresponding to the determined wireless charging scheme to switch to an on-state, and may control switches connected to the remaining conductive patterns to switch to an off-state. In operation 1340, the wireless power transmission apparatus may conduct a control such that an electric signal of an AC waveform, which has a frequency corresponding to the determined wireless charging scheme, is applied to the selected conductive pattern by using a shared switch and a switch corresponding to the selected conductive pattern.

Figure 14:
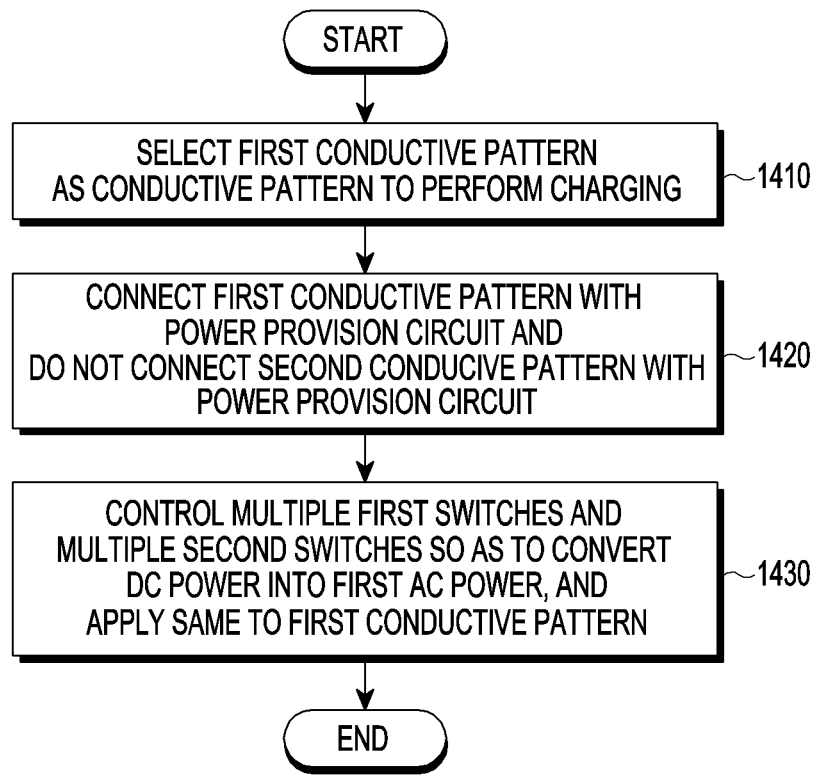
FIG. 14 is a flowchart illustrating a method for operating a wireless power transmission apparatus according to various embodiments of the disclosure.

FIG. 14 is a flowchart illustrating a method for operating a wireless power transmission apparatus according to various embodiments of the disclosure.

The wireless power transmission apparatus of FIG. 14 may include a power provision circuit configured to provide DC power, a first conductive pattern, a second conductive pattern, multiple first switches connected to one end of the first conductive pattern and to one end of the second conductive pattern, multiple second switches connected to the other end of the first conductive pattern, and multiple third switches connected to the other end of the second conductive pattern.

In operation 1410, the wireless power transmission apparatus (or the control circuit included in the wireless power transmission apparatus) may select the first conductive pattern as a conductive pattern to perform charging. In various embodiments of the disclosure, the wireless power transmission apparatus may apply power configured to detect an electronic device to the first conductive pattern and to the second conductive pattern, and may select the first conductive pattern as a conductive pattern to perform charging on the basis of an impedance change detected from each of the first conductive pattern and to the second conductive pattern. The power configured to detect an electronic device may be at least one of power corresponding to a ping defined by the Qi standard or a short beacon or a long beacon defined by the AFA standard.

In operation 1420, the wireless power transmission apparatus may connect the first conductive pattern and the power provision circuit and may not connect the second conductive pattern and the power provision circuit.

In various embodiments of the disclosure, the wireless power transmission apparatus may control the fourth switch that selectively connects the power provision circuit and the first conductive pattern to switch to an on-state and may control the fifth switch that selectively connects the power provision circuit and the second conductive pattern to switch to an off-state.

In operation 1430, the wireless power transmission apparatus may control the multiple first switches and the multiple second switches so as to convert the DC power into first AC power, and may apply the same to the first conductive pattern. In various embodiments of the disclosure, the wireless power transmission apparatus may control the multiple first switches and the multiple second switches such that the DC power is converted into the first AC power having a frequency corresponding to the first conductive pattern. In various embodiments of the disclosure, the wireless power transmission apparatus may control the multiple first switches and the multiple second switches so as to convert the DC power into the first AC power having a frequency defined by a first charging scheme corresponding to the first conductive pattern, and may apply the same to the first conductive pattern.

Each of the above-mentioned constituent elements of the wireless power transmission apparatus may include one or more components, and the name of the corresponding constituent element may vary depending on the kind of the wireless power transmission apparatus. In various embodiments, the wireless power transmission apparatus may include at least one of the above-mentioned constituent elements, some constituent elements may be omitted, or the same may further include other additional constituent elements. In addition, some of the constituent elements of the electronic device according to various embodiments may be combined so as to constitute a single entity such that the same can perform the same functions of the corresponding constituent elements before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. When the command is executed by one or more processors (for example, the processor 52), the one or more processors may execute a function corresponding to the command. The computer-readable storage medium may be, for example, a memory included in the wireless power transfer device.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments of the disclosure, a storage medium may have commands stored therein. The commands may be configured to cause, when executed by at least one processor, the at least one processor to perform at least one operation. The at least one operation may include the operations of: selecting the first conductive pattern as a conductive pattern to perform charging; connecting the first conductive pattern with a power provision circuit and not connecting the second conductive pattern with the power provision circuit; and controlling the multiple first switches and the multiple second switches so as to convert the DC power into first AC power and to apply the first AC power to the first conductive pattern.

Various embodiments disclosed herein are provided merely to easily describe technical details of the disclosure and to help the understanding of the disclosure and are not intended to limit the scope of the disclosure. Therefore, it should be construed that all modifications and changes or modified and changed forms based on the technical idea of the disclosure fall within the scope of the disclosure.

What is claimed is:

1. A wireless power transmission apparatus comprising:
    a power provision circuit configured to provide DC power;
    a first conductive pattern;
    a second conductive pattern;
    multiple first switches connected to one end of the first conductive pattern and to one end of the second conductive pattern;
    multiple second switches connected to the other end of the first conductive pattern;
    multiple third switches connected to the other end of the second conductive pattern; and
    a control circuit, wherein
    the control circuit is configured to control the multiple first switches and the multiple second switches so as to convert the DC power into first AC power and to apply the first AC power to the first conductive pattern, and
    the control circuit is configured to control the multiple first switches and the multiple third switches so as to convert the DC power into second AC power and to apply the second AC power to the second conductive pattern.

2. The wireless power transmission apparatus of claim 1, further comprising:
    a fourth switch configured to selectively connect the power provision circuit and the first conductive pattern; and
    a fifth switch configured to selectively connect the power provision circuit and the second conductive pattern.

3. The wireless power transmission apparatus of claim 2, wherein the control circuit is configured to select the first conductive pattern as a conductive pattern to perform charging, to control the fourth switch to switch to an on-state, and to control the fifth switch to switch to an off-state.

4. The wireless power transmission apparatus of claim 3, wherein the control circuit is configured to control the multiple first switches and the multiple second switches so as to convert the DC power into the first AC power having a frequency corresponding to the first conductive pattern.

5. The wireless power transmission apparatus of claim 4, wherein the control circuit is configured to control the multiple third switches to switch to an off-state.

6. The wireless power transmission apparatus of claim 3, wherein the control circuit is configured to apply power configured to detect an electronic device to the first conductive pattern and to the second conductive pattern, and the control circuit is configured to select the first conductive pattern as the conductive pattern to perform charging on the basis of an impedance change detected from each of the first conductive pattern and the second conductive pattern.

7. The wireless power transmission apparatus of claim 6, wherein the power configured to detect an electronic device is at least one of power corresponding to aping defined by Qi standard or a short beacon or a long beacon defined by AFA standard.

8. The wireless power transmission apparatus of claim 2, wherein each of the fourth switch and the fifth switch is a P-MOSFET (positive metal oxide semiconductor field-effect transistor), and the drain of the P-MOSFET is connected to the power provision circuit.

9. The wireless power transmission apparatus of claim 1, wherein the multiple first switches and the multiple second switches constitute a first bridge circuit, and the multiple first switches and the multiple third switches constitute a second bridge circuit.

10. The wireless power transmission apparatus of claim 1, wherein the first conductive pattern and the second conductive pattern are arranged to cover different charging areas.

11. The wireless power transmission apparatus of claim 1, wherein the first conductive pattern is configured to wirelessly transmit power by using first AC power on the basis of a first charging scheme, and the second conductive pattern is configured to wirelessly transmit power by using second AC power on the basis of a second charging scheme.

12. The wireless power transmission apparatus of claim 11, wherein the control circuit is configured to select the first conductive pattern as a conductive pattern to perform charging, and the control circuit is configured to control the multiple first switches and the multiple second switches so as to convert the DC power into the first AC power having a frequency defined by the first charging scheme and to apply the first AC power to the first conductive pattern.

13. The wireless power transmission apparatus of claim 1, further comprising:
    a first capacitor connected to the first conductive pattern so as to constitute a first resonance circuit with the first conductive pattern; and
    a second capacitor connected to the second conductive pattern so as to constitute a second resonance circuit with the second conductive pattern.

14. A method for operating a wireless power transmission apparatus comprising a power provision circuit configured to provide DC power, the method comprising:
    selecting a first conductive pattern as a conductive pattern to perform charging, wherein the wireless power transmission apparatus comprising the first conductive pattern, a second conductive pattern, multiple first switches connected to one end of the first conductive pattern and to one end of the second conductive pattern, multiple second switches connected to the other end of the first conductive pattern, and multiple third switches connected to the other end of the second conductive pattern;

connecting the first conductive pattern with the power provision circuit and not connecting the second conductive pattern with the power provision circuit; and controlling the multiple first switches and the multiple second switches so as to convert the DC power into first AC power and to apply the first AC power to the first conductive pattern.

15. The method of claim 14, wherein, in the controlling the multiple first switches and the multiple second switches so as to convert the DC power into first AC power and to apply the first AC power to the first conductive pattern, the multiple first switches and the multiple second switches are controlled so as to convert the DC power into the first AC power having a frequency corresponding to the first conductive pattern.

* * * * *